United States Patent [19]

Kohri et al.

[11] Patent Number: 5,072,319
[45] Date of Patent: Dec. 10, 1991

[54] MAGNETIC RECORDING/OR REPRODUCING APPARATUS

[75] Inventors: Toshiyuki Kohri, Neyagawa; Kanji Kubo, Hirakata, both of Japan

[73] Assignee: Matsushita Electric Industrial Co., Ltd., Osaka, Japan

[21] Appl. No.: 465,216

[22] PCT Filed: Jul. 7, 1989

[86] PCT No.: PCT/JP89/00689
§ 371 Date: Mar. 26, 1990
§ 102(e) Date: Mar. 26, 1990

[87] PCT Pub. No.: WO90/00796
PCT Pub. Date: Jan. 25, 1990

[30] Foreign Application Priority Data

Jul. 11, 1988 [JP] Japan .................. 63-172140

[51] Int. Cl.$^5$ ............................................. G11B 5/592
[52] U.S. Cl. ................................. 360/77.16; 360/77.14
[58] Field of Search ........................... 360/77.14, 77.16

[56] References Cited

FOREIGN PATENT DOCUMENTS 60-109017 6/1985 Japan .
63-61407 3/1988 Japan .
64-10409 1/1989 Japan .

Primary Examiner—Aristotelis Psitos
Assistant Examiner—David L. Robertson
Attorney, Agent, or Firm—Wenderoth, Lind & Ponack

[57] ABSTRACT

There is provided a correction value generating means (15) which utilizes, as a correction value, the difference between a first tracking error signal provided by a first tracking error detecting means (13) and a second tracking error signal provided by a second tracking error detecting means (10) where any one of first magnetic heads (3), (4) and second magnetic heads (5), (6) fitted through electric-mechanical transducing elements (7), (8) is in a state of reproducing, but the difference between the second tracking error signal of a recorded track being currently reproduced and the second tracking error signal preceding the recorded track is used as the correction value where the first magnetic heads (3), (4) are in a state of recording while the second magnetic heads (5), (6) are in a state of reproducing, so that the correction value can be used to correct a reference signal used to drive the electric-mechanical transducing elements thereby to control the electric-mechanical transducing elements (7), (8) whereby the first magnetic heads can during the recording scan the track so as to follow a curvature thereof to accomplish a favorable editing and recording wherein, even in a magnetic tape having bent tracks differing at the start and end points of the editing and recording, neither erasure of the tracks on respective sides of a joint nor insufficient erasure occur.

8 Claims, 16 Drawing Sheets $$S = \frac{\theta}{180°} \times Tp$$

MAGNETIC RECORDING/OR REPRODUCING APPARATUS

FIELD OF TECHNOLOGY

The present invention relates to a magnetic recording and/or reproducing apparatus (hereinafter referred to as VTR) and, more particularly, to the recording at a movable head.

BACKGROUND ART

Recently, in VTR, in order to accomplish a long-time recording, a method is employed wherein the tape transport speed is lowered during a recording to increase the recording density. This results in reduction in width of any one of recorded tracks. By way of example, the track width in a long-time recording mode in a 8-mm VTR is 10 μm. In order for a reproducing head to accurately scan such narrow recorded tracks, a tracking control is required for controlling the position of a reproducing magnetic head relative to each of the recorded tracks by the use of a movable head.

In some of the VTRs, the use of an electric-mechanical transducing element is made to vary the mechanical heightwise position of the magnetic head to accomplish a noiseless reproduction not only during a normal reproduction in which reproduction is carried at the same tape transport speed $V_N$ as that during the recording, but also during any one of a still reproduction in which the scanning is carried out with the tape held still, a slow-motion reproduction in which the scanning is carried out at a tape transport speed which is lower than the tape transport speed $V_N$ and a double-speed reproduction in which the scanning is carried out at a tape transport speed which is higher than the tape transport speed $V_N$.

Hereinafter, the noiseless reproduction with the use of the movable head will briefly be discussed.

FIG. 18 is a schematic diagram showing scanning traces of the head depicted during such a special reproduction as hereinbefore described. Since the tape transport speed during the normal reproduction is the same as that during the recording, the angle $\theta_N$ of inclination of each scanning trace on the tape is, as shown by the arrow 1802, equal to the angle $\theta_T$ of inclination of any one of the recorded tracks T and the reproducing head can accordingly scan any one of the recorded tracks accurately.

However, when a reproducing speed is changed from the tape transport speed $V_N$ and, for example, if the direction of movement of the tape is in a direction shown by the arrow 1805 with the tape moved at a three-fold speed, the direction of scan of the reproducing head on the tape will be such a direction as indicated by the arrow 1803, or such a direction as indicated by 1804 in the case of the still reproduction, and the angle of inclination thereof will become $\theta_3$ or $\theta_0$, respectively, which is different from the angle $\theta_T$ of inclination of the recorded track T.

Accordingly, in such a case, the reproducing head will scan while straddling a plurality of the recorded tracks and an image will be disturbed under the influence of noises. In view of this, if the reproducing head is fitted with an electric-mechanical transducing element such as a piezoelectric transducer or the like and a voltage proportional to the amount of deviation between the direction of scan, shown by the arrow 1802 in FIG. 18, during the normal reproduction and the direction of scan, shown by the arrows 1803 and 1804, during the reproduction which is accomplished at a different tape transport speed is supplied to the electric-mechanical transducing element, the magnetic head can accurately scan the recorded track T, resulting in reproduction of a noiseless reproduced image.

A method of recording and reproducing with the use of such an electric-mechanical transducing element is suggested in SMPTE Journal, December (1984), p.1134 to p.1137. According to this suggestion, the electric-mechanical transducing element is driven with the use of a control signal, indicative of the position of the tape, and an FG signal of a capstan, so that a still recording and a field or frame recording can be accomplished as defined by a format.

However, with this conventional construction, if the electric-mechanical transducing element such as a piezoelectric transducer has a deviation in both of the hysteresis characteristic and the driving sensitivity, there is a possibility that a deviation may occur from a track pattern of the format even if a control is effected to apply a predetermined value to a driving circuit for the electric-mechanical transducing element so that a predetermined applied voltage can be supplied to the electric-mechanical transducing element. Also, if an attempt is made to effect a recording with the magnetic head on the electric-mechanical transducing element during, for example, an insert edition to accomplish the recording in which a track curvature of the recorded track is taken into consideration, the presence of the deviation in the hysteresis characteristic as well as the driving sensitivity may result in that the scanning trace of the magnetic head will be different from the target recorded track. Consequently, there is a problem in that the recorded track pitches between the currently recorded tracks and the previously recorded tracks will vary from place to place and, at the joint such as formed during, for example, the insert edition, the previously recorded track may be erased.

DISCLOSURE OF THE INVENTION

The present invention is intended to provide VTR of a type wherein the absolute height of the electric-mechanical transducing element and the driving gain are supervised to permit the magnetic head on the electric-mechanical transducing element to accomplish a favorable recording in which the track curvature is taken into consideration.

The present invention comprises a first magnetic head fitted through an electric-mechanical transducing element; a second magnetic head disposed so as to scan a track, scanned by the first magnetic head, after a predetermined time; first and second tracking error detecting means for detecting amounts of deviation between scanning traces on a tape, depicted by the first and second magnetic heads, and recorded tracks on which signals are recorded in correspondence with the scanning traces, respectively; and a correction value generating means for generating a correction value which is a difference between a first tracking error signal, outputted from the first tracking error detecting means, and a second tracking error signal outputted from the second tracking error detecting means in the case where any one of the first and second magnetic heads is in a state of reproducing, but which is a difference between the second tracking error signal, resulting from the recorded track being currently reproduced, and the second tracking error signal resulting from the recorded track preceding such recorded track in the case where the first and second magnetic heads are in a state of recording and in a state of reproducing, respectively, said correction value being utilized to correct a reference signal which is used to drive the electric-mechanical transducing element thereby to control the electric-mechanical transducing element.

BEST MODE FOR CARRYING OUT THE INVENTION

Figure 1:
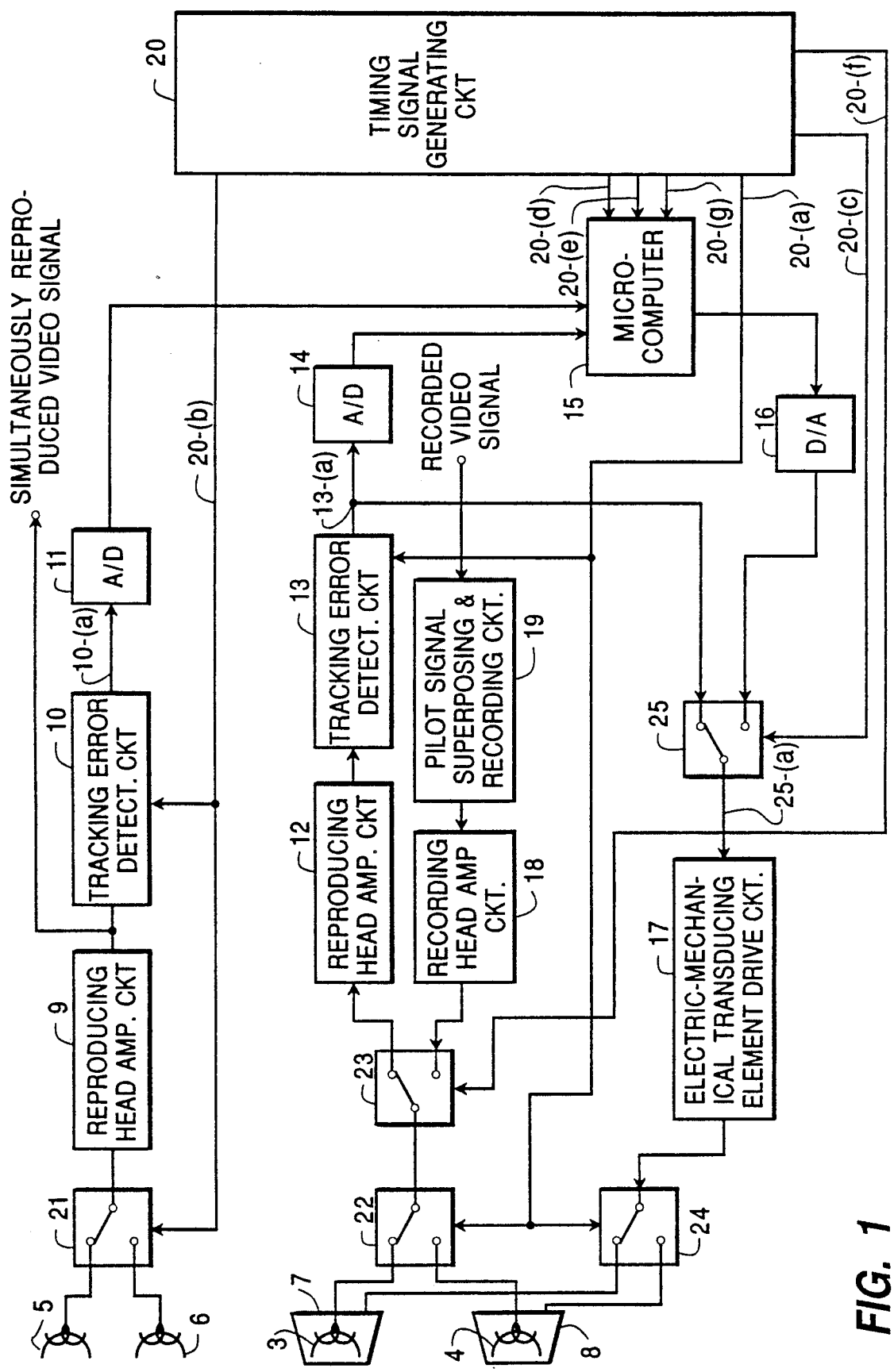
FIG. 1 is a block circuit diagram of a magnetic recording and/or reproducing apparatus according to a first embodiment of the present invention.

FIG. 1 is a diagram showing a first embodiment of the present invention. Before the description of the operation of the embodiment proceeds, individual blocks and contents of various signals will first be described. In FIG. 1, reference numerals 7 and 8 represent electric-mechanical transducing elements such as, for example, piezoelectric transducers, used to drive first magnetic heads 3 and 4, respectively. Reference numerals 3 and 4 represent the above described first magnetic heads fitted to the electric-mechanical transducing elements 7 and 8, respectively; reference numerals 5 and 6 represent second magnetic heads for scanning, after a predetermined time, tracks scanned by the first magnetic heads 3 and 4, respectively; reference numerals 9 and 12 represent reproducing head amplifier circuits for the second magnetic heads 5 and 6 and the first magnetic heads 3 and 4, respectively; reference numeral 10 represents a tracking error detecting circuit which utilizes a reproduced signal, outputted from the second magnetic head 5 or 6, for detecting a tracking error signal indicative of the direction and the amount of deviation from the center of a recorded track of the second magnetic head 5 or 6; reference numerals 11 and 14 represent A/D converters for effecting an A/D conversion to tracking error signals, respectively; reference numeral 13 represents a tracking error detecting circuit which utilizes a reproduced signal, outputted from the first magnetic head 3 or 4, for detecting a tracking error signal indicative of the direction and the amount of deviation from the center of a recorded track of the first magnetic head 3 or 4; and reference numeral 15 represents a microcomputer for executing a process of generating a driving data from a tracking error data; reference numeral 16 represents a D/A converter for effecting a D/A conversion to the tracking error data. Reference numeral 17 represents an electric-mechanical transducing element driving circuit for driving the electric-mechanical transducing elements 7 and 8 for driving the magnetic heads; reference numeral 18 represents a recording amplifier circuit for the first magnetic heads 3 and 4; reference numeral 19 represents a pilot signal superposing and recording circuit for superposing and recording a pilot signal on a recorded video signal; reference numeral 20 represents a timing signal generating circuit for generating a timing for selecting the reproduced signal from the first magnetic head 3 or 4 and a timing for selecting the reproduced signal from the second magnetic head 5 and 6; reference numeral 21 represents a changeover switch for selecting one of the reproduced signals from the second magnetic heads 5 and 6; reference numeral 22 represents a changeover switch for selecting one of the reproduced signals from the first magnetic heads 3 and 4; reference numeral 23 represents a changeover switch for switching the first magnetic head 3 or 4 into one of recording and reproducing positions; reference numeral 24 represents a changeover switch for selecting a drive of one of the electric-mechanical transducing elements 7 and 8; and reference numeral 25 represents a changeover switch for selecting one of a signal from the tracking error detecting circuit 13 and a signal processed by the microcomputer 15 which is to be supplied to the electric-mechanical transducting element driving circuit 17. Reference numeral 10-(a) represents the tracking error signal obtained from the second magnetic head 5 or 6; reference numeral 13-(a) represents the tracking error signal obtained from the first magnetic head 3 or 4; reference numeral 20-(a) represents a head switching signal for selecting one of the first magnetic heads 3 and 4; reference numeral 20-(b) represents a head switching signal for selecting one of the second magnetic heads 5 and 6; reference numeral 20-(c) represents a switching signal for selectively switching the first magnetic head 3 or 4 into one of recording and reproducing positions;

reference numeral 20-(d) represents a timing signal for writing the tracking error signal from the first magnetic head 3 and 4 into a memory; reference numeral 20-(e) represents a timing signal for writing the tracking error signal from the second magnetic head 5 or 6 into the memory; reference numeral 20-(f) represents a timing signal for selecting one of the signal from the tracking error detecting circuit 13 and the signal processed by the microcomputer 15 which is to be supplied to the electric-mechanical transducing element driving circuit 17; reference numeral 20-(g) represents a timing signal for determining the start and the end of the edit; and reference numeral 25-(a) represents a driving data to be supplied to the driving circuit 17.

Figure 2:
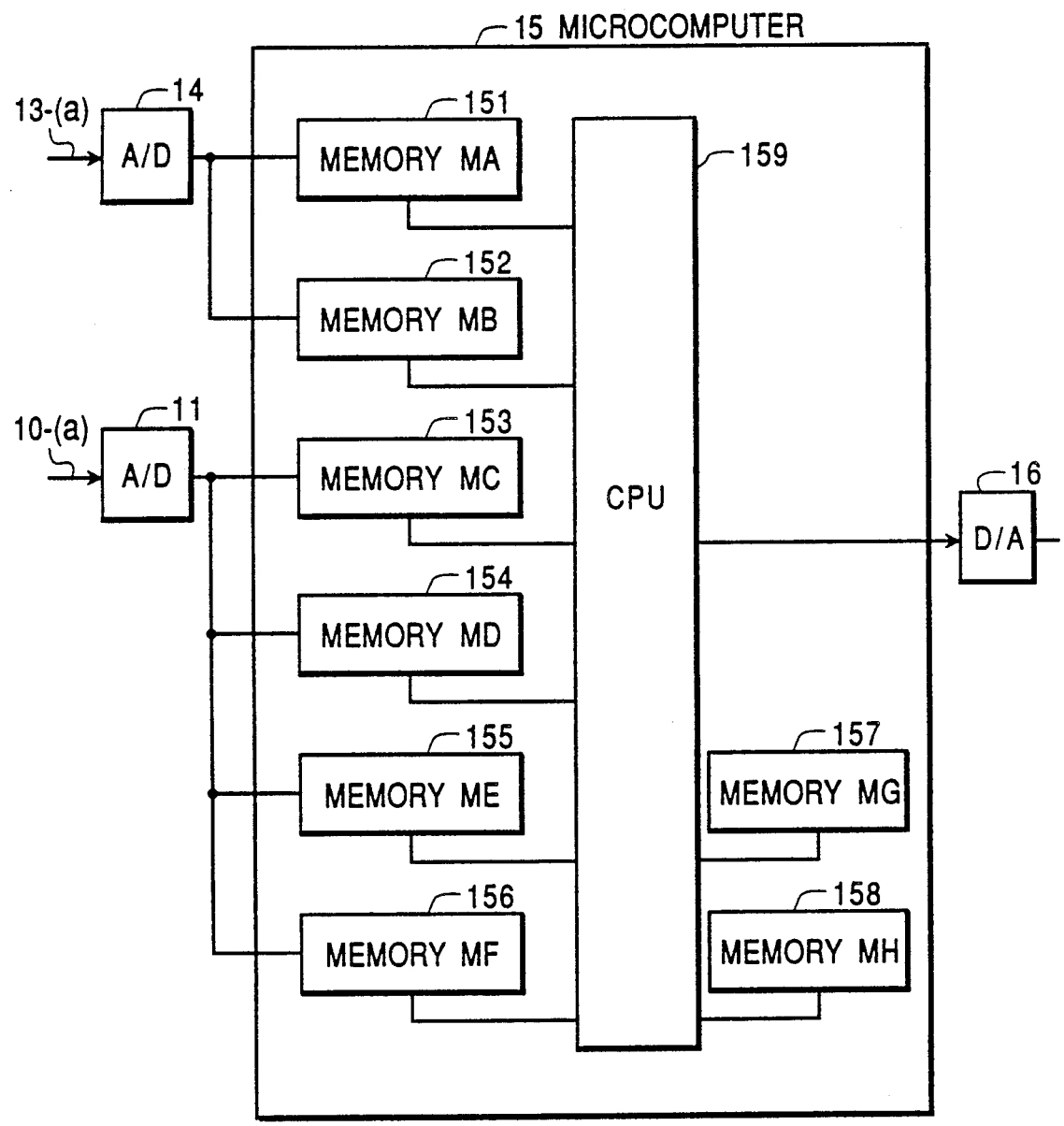
FIG. 2 is a diagram showing the structure of a memory used in a microcomputer 15.

FIG. 2 is a diagram showing the memory structure of the microcomputer 15. Reference numeral 151 represents a memory MA; reference numeral 152 represents a memory MB; reference numeral 153 represents a memory MC; reference numeral 154 represents a memory MD; reference numeral 155 represents a memory ME; reference numeral 156 represents a memory MF; reference numeral 157 represents a memory MG; reference numeral 158 represents a memory MH; and reference numeral 159 represents CPU. The memories MA 151 and MB 152 are memories for storing the tracking error signal 13-(a) detected by the magnetic heads 3 and 4; the memories MC 153, MD 154, ME 155 and MF 156 are memories for storing the tracking error signal 10-(a) detected by the magnetic heads 5 and 6; and the memories MG 157 and MH 158 are memories for retaining the reference value to be supplied to the electric-mechanical transducing element driving circuit 17. CPU 159 executes a process of generating a driving data for correcting the absolute height of the electric-mechanical transducing elements 7 and 8 from the memory MA 151 to the memory MG 157.

Figure 3:
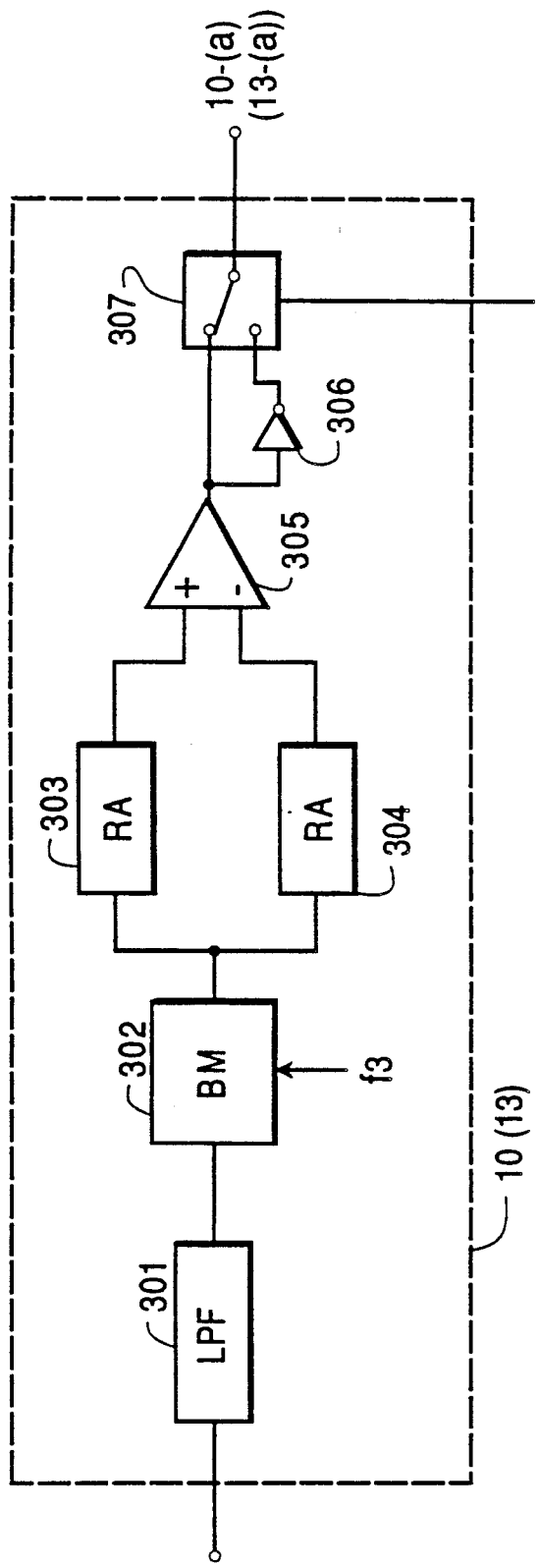
FIG. 3 is a block circuit diagram of a tracking error detecting circuit for providing a tracking error signal.
Figure 4:
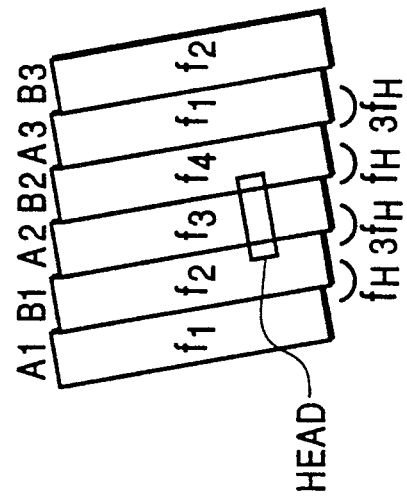
FIG. 4 is a schematic diagram showing recorded and magnetized tracks according to a tracking method in which four frequency pilot signals are employed.

FIG. 3 is a block circuit diagram of the tracking error detecting circuit 10 (13) for providing the tracking error signal. FIG. 4 illustrates recorded and magnetized traces by a tracking method in which four frequency pilot signals are utilized, wherein reference characters $f_1$, $f_2$, $f_3$ and $f_4$ represent respective pilot signals for a tracking control. In FIG. 3, a terminal 1 receives a reproduced signal formed by combining a video signal, supplied from the second (first) magnetic head 5 (3) or 6 (4), and the pilot signals together. Reference numeral 301 represents a low-pass filter (LPF) for extracting only the pilot signals from the reproduced signal. Reference numeral 302 represents a balanced modulating circuit (BM) operable to multiply an output signal from the low-pass filter and the pilot signals recorded on a main scanning track. By way of example, in FIG. 4, when the head scan a track $A_2$ for reproduction, an input signal to the balanced modulating circuit 302 is $f_2$, $f_3$ and $f_4$ and a reference signal supplied is $f_3$. Accordingly, an output signal from the balanced modulating circuit 302 is outputted in the form of a signal indicative of the sum and the difference of the various signals $f_2$, $f_3$ and $f_4$ and the signal $f_3$. Reference numeral 303 represents a tuning amplifier circuit (RA) capable of tuning with a signal of $f_H$ (difference frequencies between $f_1$ and $f_2$ and between $f_3$ and $f_4$), and reference numeral 304 represents a tuning amplifier circuit (RA) for a difference frequency of $3f_H$ ($f_2$ and $f_3$, and $f_4$ and $f_1$). Reference numeral 305 represents a differential amplifier. Reference numeral 306 represents an inverter. Reference numeral 307 represents a signal changeover switch. While the details of the method of detecting the tracking error signal utilizing the four frequency pilot signals applied in the present embodiment will not be herein described because it is a well-known method, the tracking error signal can be obtained as a signal 10-(a) (13-(a)) by a circuit construction as shown in FIG. 3.

Figure 5:
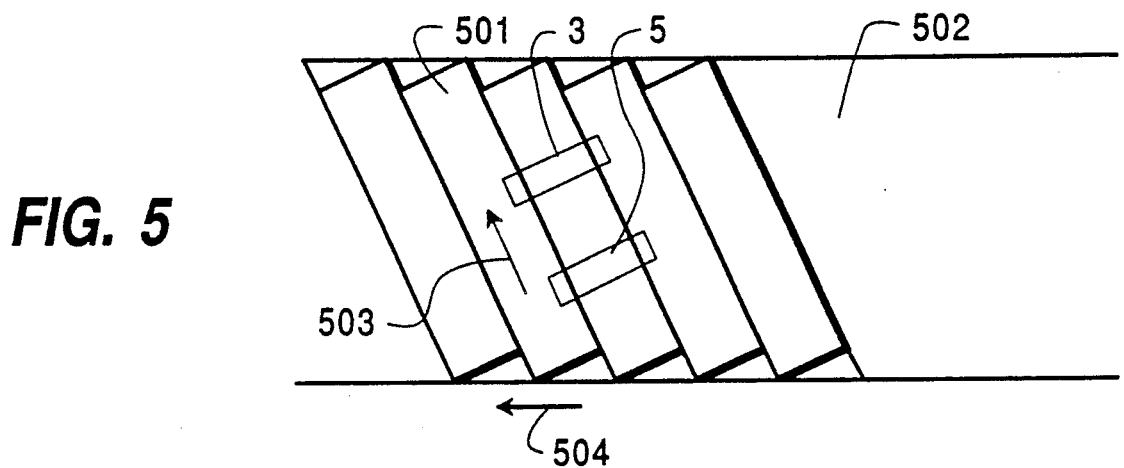
FIG. 5 is a diagram showing the relationship in position between magnetic heads 3 and 5 on the track.

FIG. 5 is a diagram showing the relationship in position on the track of the magnetic heads 3 and 5 and, in a system wherein a magnetic tape 502 moves in a direction shown by the arrow 504 and the magnetic heads 3 and 5 moves on the track 501 in a direction shown by the arrow 503, the magnetic head 3 is so arranged as to precede the magnetic head 5. Even the magnetic heads 4 and 6 have a similar relationship in position.

Figure 6A:
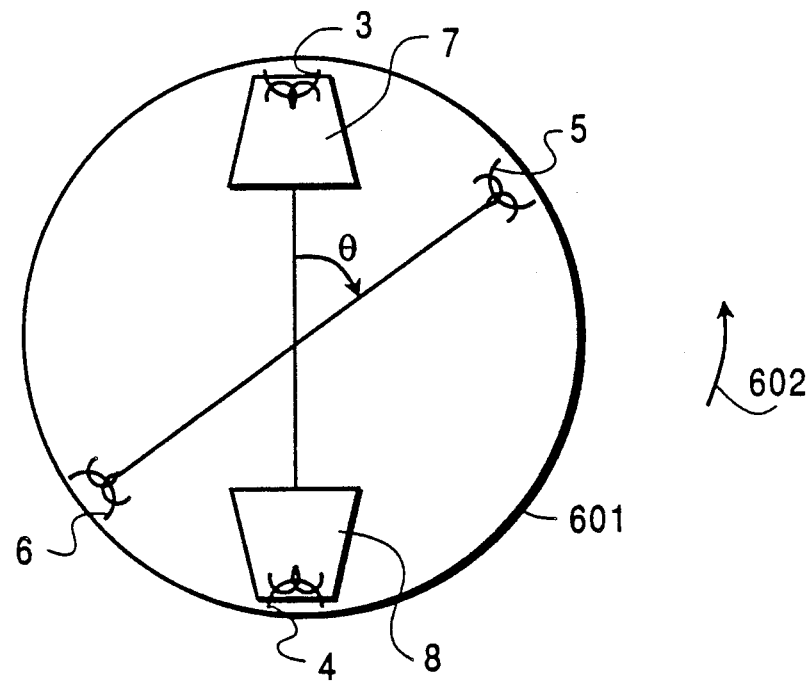
FIG. 6(a) is a diagram showing the arrangement of heads in the first embodiment.

FIG. 6(a) illustrates a diagram showing a head arrangement and the heads are mounted on a cylinder 601 so that, a predetermined time after the first magnetic heads 3 and 4 fitted through the electric-mechanical transducing elements 7 and 8 have scanned, the second magnetic heads 5 and 6 can scan. The arrow 602 represents the direction of rotation of the cylinder 401. It is to be noted that reference character $\theta$ represents the layout angle between the first magnetic heads and the second magnetic heads.

Figure 6B:
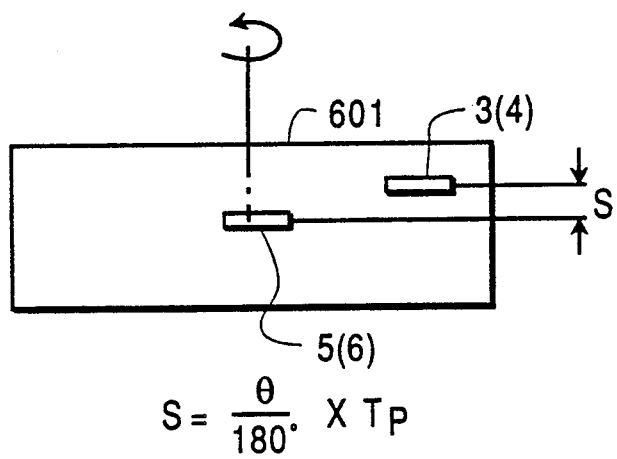
FIG. 6(b) is a diagram showing the relationship in mechanical position between the first and second magnetic heads 3 and 5.

FIG. 6(b) is a diagram showing a mechanical relationship in position between the first magnetic head 3 (4) and the second magnetic head 5 (6), wherein the amount S ($\mu$m) of mechanical deviation in height between the first magnetic head 3 (4) and the second magnetic head 5 (6) is expressed as follows.

$$S = (\theta/180) \times Tp$$

$\theta$: Layout angle (DEG)
Tp: Track pitch ($\mu$m)

Hereinafter, the general operation of the magnetic recording and/or reproducing apparatus to which the present embodiment is applied will be described. FIG. 1 is a block circuit diagram of the magnetic recording and/or reproducing apparatus of the present invention. The reproduced signals reproduced by the second magnetic heads 5 and 6 are, after having been selected by the head switching signal 20-(b) used to select one of the second magnetic heads 5 and 6, supplied to the tracking error detecting circuit 10 through the reproducing amplifier circuit 9. Also, this reproduced signals are concurrently used as simultaneously reproduced video signals. The tracking error signal 10-(a) detected by the tracking error detecting circuit 10 is, after having been converted into an analog signal by the A/D converter 11, stored in the memory MC 153 to the memory MF 156. In the first magnetic heads 3 and 4, during the normal reproduction, as is the case with the second magnetic heads, after having been selected by the head switching signal 20-(a) used to select one of the first magnetic heads 3 and 4, supplied to the tracking error detecting circuit 13 through the reproducing head amplifier circuit 12 and the tracking error signal 13-(a) is supplied to the electric-mechanical transducing element driving circuit 17 for driving the electric-mechanical transducing elements 7 and 8. As a result thereof, the first magnetic heads 3 and 4 are driven in response to the tracking error signal 13-(a) to scan the track on track. Also, when during the edit track preceding some tracks from the start point of editing is to be reproduced, the signal to be supplied to the electric-mechanical transducing driving circuit 17 is switched from the tracking error signal 13-(a) onto an output signal from the D/A converter 16 which is a driving data for zeroing a drive voltage of the electric-mechanical transducing elements 7 and 8. During the edit, that is, during the recording, the recorded video signal on which the pilot signal is superposed by the pilot signal superposing and recording circuit 19 is supplied to the first magnetic heads 3 and 4 through the recording amplifier circuit 18. On the other hand, the driving data generated by the microcomputer 15 is converted into an analog signal by the D/A converter 16 and is then supplied to the electric-mechanical transducing element driving circuit 17. Also, by causing the magnetic heads 5 and 6 to scan immediately after the recording effected by the magnetic heads 3 and 4, the tracking error signal 10-(a) is detected and stored sequentially in the memory ME 155 and the memory MF 156. Then, by comparing the data in the memory MC 153 with the data in the memory ME 155 and the data in the memory MD 154 with the data in the memory MF 156, the driving data 25-(a) is determined so that the difference can become zero. As a result thereof, the absolute height of the electric-mechanical transducing elements 7 and 8, that is, the first magnetic heads 3 and 4, can be accomplished. It is to be noted that, although in the present embodiment an output from the reproducing head amplifier circuit 9 is employed for the simultaneously recorded video signal, an output from the reproducing head amplifier circuit 12 associated with the first magnetic heads may be employed therefor.

Figure 7:
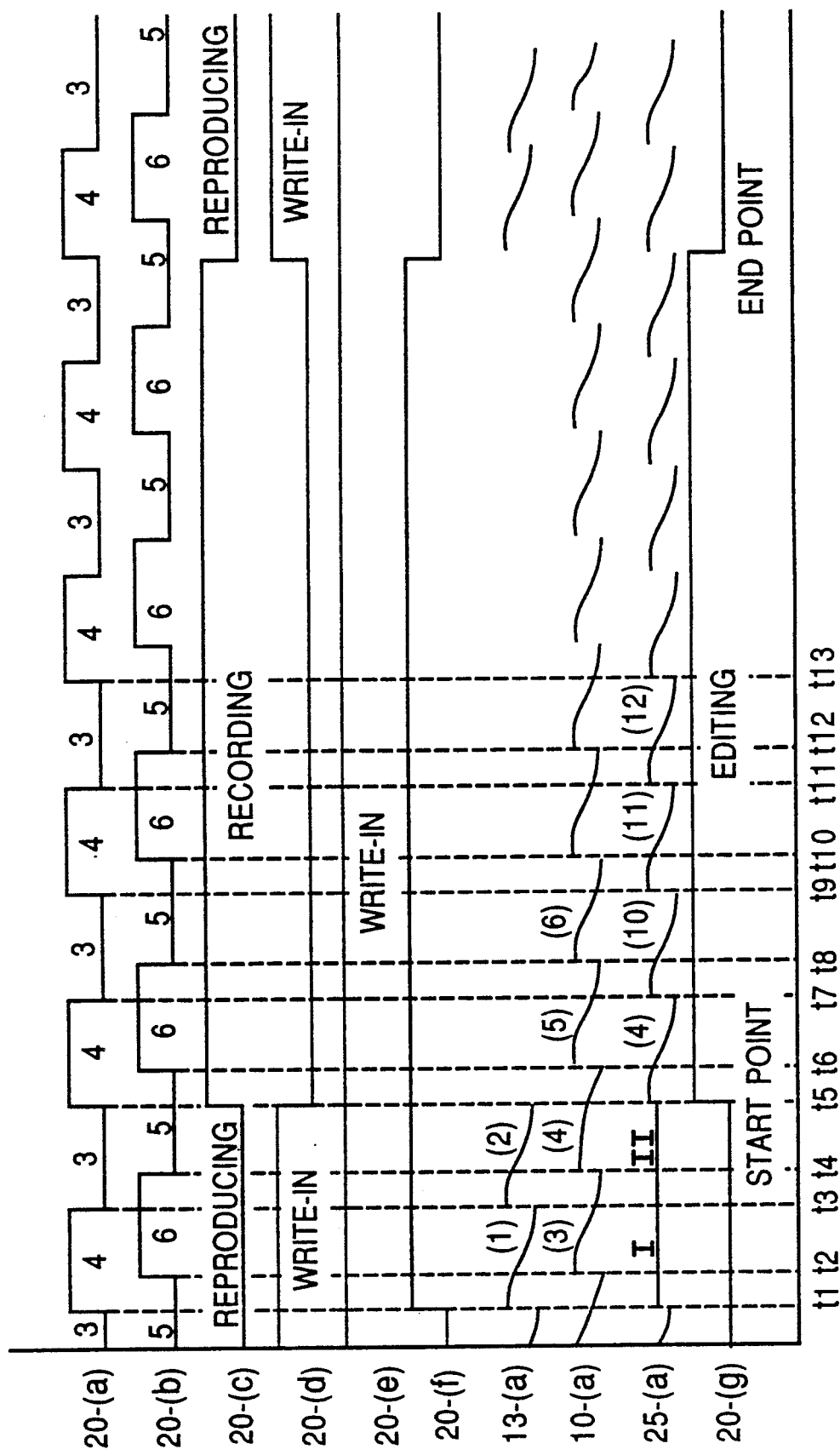
FIG. 7 is a chart showing timed relationships among various signals during an edit and tracking error signals.

Hereinafter, specific timings of various signals and the process of the microcomputer in the present embodiment will be described with reference to FIG. 7 and FIGS. 8(a) to 8(c). FIG. 7 is a diagram showing the timings of the various signals during the insert edit and the tracking error signals. In FIG. 7, what is referenced by the same reference numerals as those in FIG. 1 has the same meaning. Reference numeral 20-(a) represents the head switching signal for selecting one of the first magnetic heads 3 and 4; reference numeral 20-(b) represents the head switching signal for selecting one of the second magnetic heads 5 and 6; reference numeral 20-(c) represents the switching signal for selectively switching the first magnetic head 3 or 4 into one of the recording and reproducing positions; reference numeral 20-(d) represents the timing signal for writing the tracking error signal from the first magnetic head 3 or 4 into the memory; reference numeral 25-(a) represents a driving data to be supplied to the driving circuit 17; reference numerals I and II represent D/A converted signals of reference values A and B stored in the memories 157 and 158 which are driving data necessary to zero the drive voltages of the electric-mechanical transducing elements 7 and 8, respectively; and reference numerals (9) and (10) represent driving data to be stored in the memory MG 157 and the memory MH 158, respectively, as reference values AA and BB which correspond to a data (1), stored in the memory MA 151, and a data (2), stored in the memory MB 152, to which corrections are added on the basis of the reference values A and B, respectively, said reference values A and B being then updated to AA and BB, respective. - Reference numerals (11) and (12) represent driving data which are AA and BB utilizable as reference values during a tracking control at the next track and which are obtained by successively correcting data, which are the above described reference values AA and BB, so that the difference between the data (3) and (4) stored in the memory MC 153 and the memory MD 154 and the data (5) and (6) stored in the memory ME 155 and the memory MF 156 can become zero; reference numeral 13-(a) represents a the tracking error signal obtained from the first magnetic head 3 or 4, wherein reference numerals (1) and (2) represent respective signals which are written in the memory MA 151 and the memory MB 152 by a write-in timing signal 20-(d); reference numeral 20-(f) represents the timing signal for selecting one of the signal from the tracking error detecting circuit 13 and the signal processed by the microcomputer 15 which is to be supplied to the electric-mechanical transducing element driving circuit 17; reference numeral 20-(e) represents a timing signal for writing the tracking error signal from the second magnetic head 5 or 6 into the memory; and reference numeral 10-(a) represents the tracking error signal obtained from the second magnetic head 5 or 6, wherein reference numerals (3) and (4) represent respective tracking error signals to be stored in the memory MC 153 and the memory MD 154 at the time of the correction of the absolute height during the reproduction and reference numerals (5) and (6) represent respective tracking error signals to be stored in the memory ME 155 and the memory MF 156 during the recording by the first magnetic heads 3 and 4, (3) to (6) being written into the memories MA 151 to MF 156 by the write-in timing signal 20-(e). Reference numeral 20-(g) represents a timing signal for determining the start and the end of the edit.

Figure 8A:
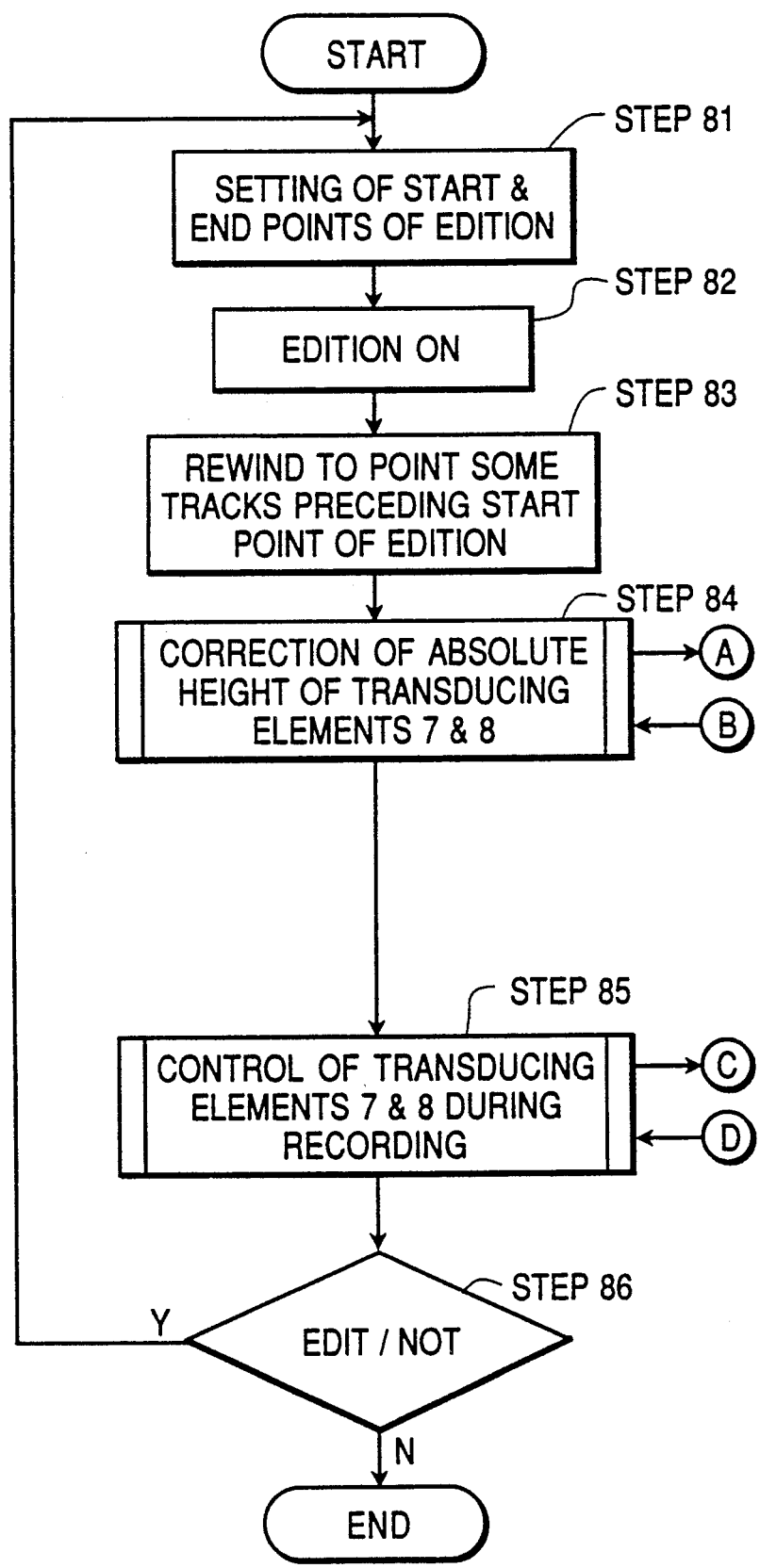
FIG. 8(a) is a flowchart showing a proces which takes place during the edit.

FIG. 8(a) illustrates the flowchart showing the principal process which takes place during the edit. After the start and end points of the edit have been set at step 81, an edit ON command is issued at step 82. Then, a rewinding is effected to a point some tracks preceding the start point of the edition at step 83 and, at step 84, the absolute height of the electric-mechanical transducing elements 7 and 8 during the reproduction is corrected until the start point of the edit. Thereafter, a routine for correcting the absolute height of the electric-mechanical transducing elements 7 and 8 during the recording is executed at step 85 on the basis of the signal 20-(g) indicative of the start point of the edition, followed by termination of the process during the edit at step 86 on the basis of the signal 20-(g) indicative of the end point of the edit.

Figure 8B:
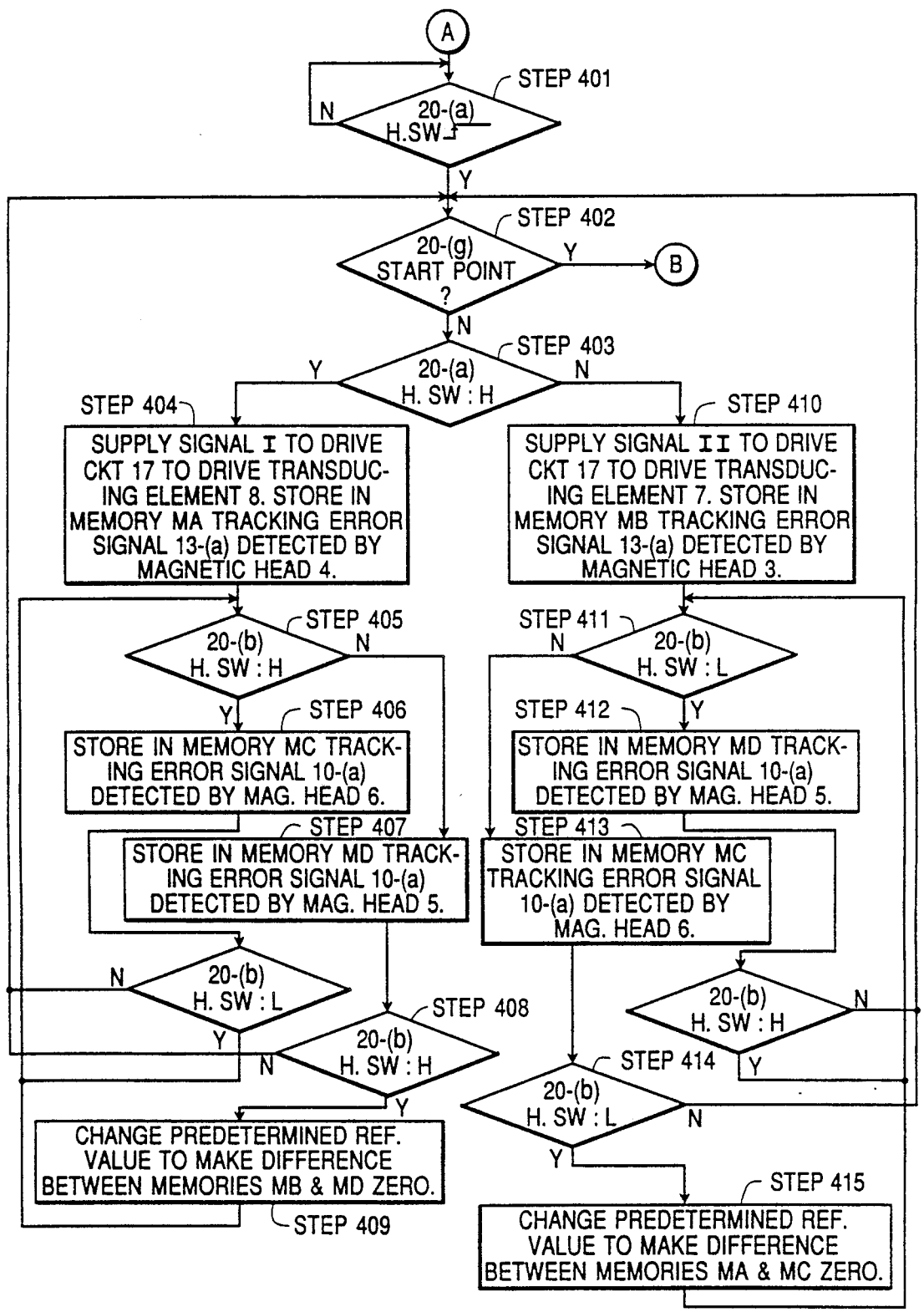
FIG. 8(b) is a flowchart showing an absolute height correcting process which takes place during a reproduction.
Figure 8C:
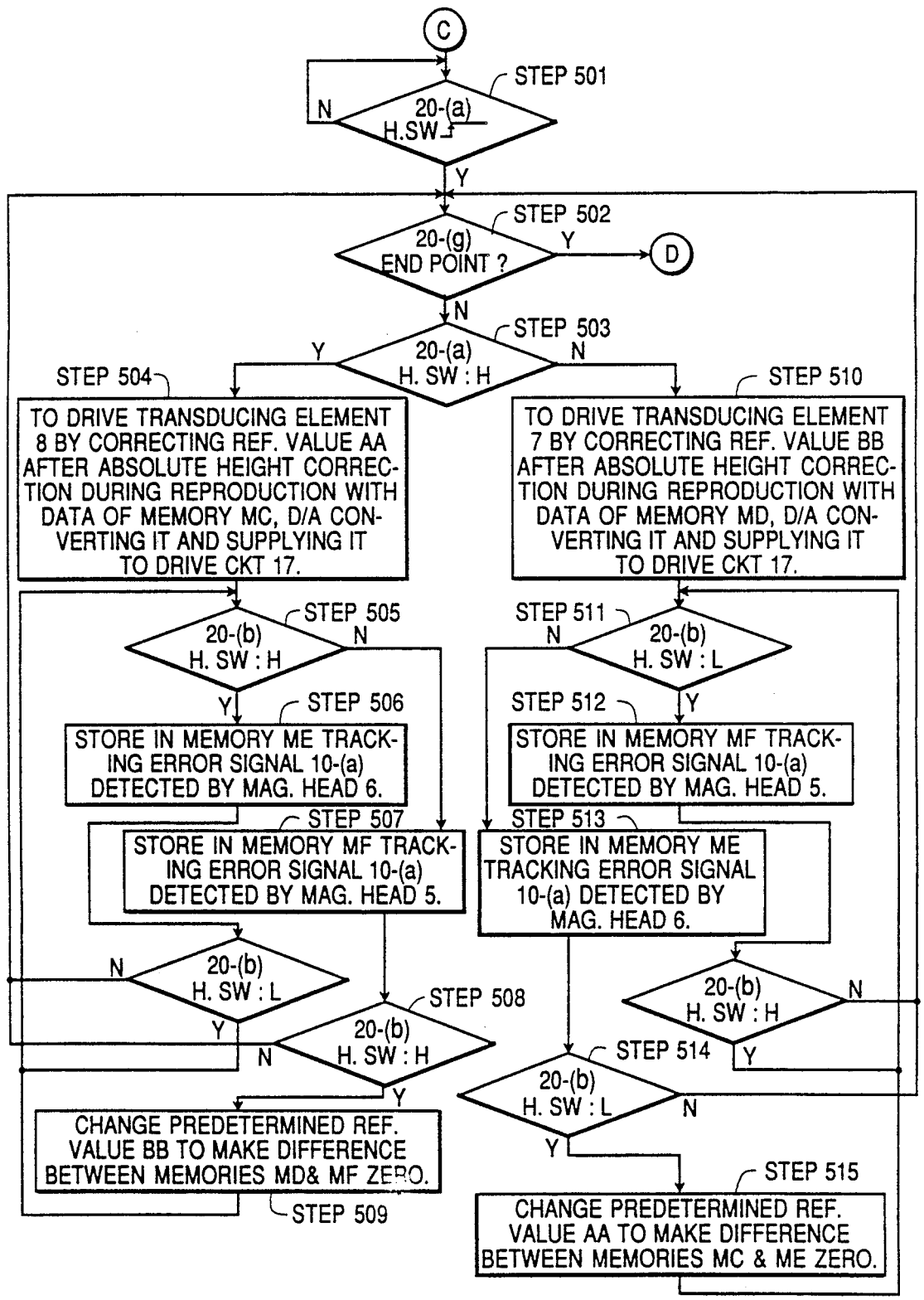
FIG. 8(c) is a flowchart showing the flow of an absolute height correcting process which takes place during a recording.

FIG. 8(b) illustrates the flowchart for the absolute height correcting process during the reproduction taking place some tracks preceding the start point of the edit. At step 401 an interruption is effected in response to a set-up edge of the head switching signal 20-(a) used to select one of the first and second magnetic heads 3 and 4 and this correcting process as will be subsequently described is continued at step 402 until the signal 20-(g) indicative of the start point of the edit is brought into a high level state. At step 403, when the head switching signal 20-(a) for selecting one of the first magnetic heads 3 and 4 is in the high level state, the signal I which is an analog signal obtained by effecting the D/A conversion to the predetermined reference value A stored in the memory MG 157 is supplied to the driving circuit 17 at step 404 to drive the electric-mechanical transducing element 8 and at the same time to store in the memory MA 151 the tracking error signal 13-(a) detected by the magnetic head 4. At step 405, when the head switching signal 20-(b) for selecting one of the second magnetic heads 5 and 6 is in a high level state, the tracking error signal 10-(a) detected by the magnetic head 6 is stored in the memory MC 153 at step 406. At step 405, when the head switching signal 20-(b) is in a low level state, the tracking error signal 10-(a) detected by the magnetic head 5 is stored in the memory MD 154 at step 407. When the head switching signal 20-(*b*) changes from the low level state to a high level state at step 408, the predetermined reference value B stored in the memory MH 158 which provides the driving data for the electric-mechanical transducing element 7 is changed at step 409 so that the difference between the memory MB 152 and the memory MD 154 may become zero. When the head switching signal 20-(*a*) for selecting one of the first magnetic heads 3 and 4 is in a low level state at step 403, the signal II which is an analog signal obtained by effecting the D/A conversion of the predetermined reference value B stored in the memory MG 158 is supplied to the driving circuit 17 at step 410, as is the case when the head switching signal 20-(*a*) has been in the high level state, thereby to drive the electric-mechanical transducing element 7 and at the same time to store in the memory MB 152 the tracking error signal 13-(*a*) detected by the magnetic head 13. When the head switching signal 20-(*b*) for selecting one of the second magnetic heads 5 and 6 is in the low level state at step 411, the tracking error signal 10-(*a*) detected by the magnetic head 5 is stored in the memory MD 154 at step 412. When the head switching signal 20-(*b*) is in the high level state at step 411, the tracking error signal 10-(*a*) detected by the magnetic head 6 is stored in the memory MC 153 at step 413. When the head switching signal 20-(*b*) changes from the high level state to a low level state at step 414, the predetermined reference value A stored in the memory MG 157 which provides the driving data for the electric-mechanical transducing element 8 is changed at step 415 so that the difference between the memory MA 151 and the memory MC 153 can become zero.

FIG. 8(*c*) illustrates a flowchart showing the flow for the absolute height correcting process during the recording (editing). An interruption is effected at step 501 in response to a set-up edge of the head switching signal 20-(*a*) for selecting one of the first magnetic heads 3 and 4 and, at step 502, the correcting process as will be subsequently described is continued until the signal 20-(*g*) indicative of the end point of the edit is brought into a low level state at step 502. At step 503, when the head switching signal 20-(*a*) for selecting one of the first magnetic heads 3 and 4 is in the high level state, the reference value AA after the absolute height correction which is stored in the memory MG 157 during the reproduction is, after having been corrected and D/A converted with data of the memory MC 153, supplied to the driving circuit 17 at step 504 to drive the electric-mechanical transducing element 8. At step 505, when the head switching signal 20-(*b*) for selecting one of the second magnetic heads 5 and 6 is in a high level state, the tracking error signal 10-(*a*) detected by the magnetic head 6 is stored in the memory ME 154 at step 506. At step 505, when the head switching signal 20-(*b*) is in a low level state, the tracking error signal 10-(*a*) detected by the magnetic head 5 is stored in the memory MF 156 at step 507. When the head switching signal 20-(*b*) changes from the low level state to a high level state at step 508, the predetermined reference value BB stored in the memory MH 158 which provides the driving data for the electric-mechanical transducing element 7 is changed at step 509 so that the difference between the memory MD 154 and the memory MH 158 may become zero. When the head switching signal 20-(*a*) for selecting one of the first magnetic heads 3 and 4 is in a low level state at step 503, the reference value BB after the absolute height correction which is stored in the memory MH 158 during the reproduction is, after having been corrected and D/A converted with data of the memory MD 154, supplied to the driving circuit 17 at step 510 to drive the electric-mechanical transducing element 8 as is the case when the head switching signal 20-(*a*) is in the high level state. When the head switching signal 20-(*b*) for selecting one of the second magnetic heads 5 and 6 is in the low level state at step 511, the tracking error signal 10-(*a*) detected by the magnetic head 5 is stored in the memory MF 156 at step 512. When the head switching signal 20-(*b*) is in the high level state at step 511, the tracking error signal 10-(*a*) detected by the magnetic head 6 is stored in the memory ME 155 at step 513. When the head switching signal 20-(*b*) changes from the high level state to a low level state at step 514, the predetermined reference value AA stored in the memory MG 157 which provides the driving data for the electric-mechanical transducing element 8 is changed at step 415 so that the difference between the memory MA 151 and the memory MC 153 can become zero.

The magnetic recording and/or reproducing apparatus of the above described construction operates in the following manner. In describing the operation thereof, reference will be made to the absolute height correction of the first magnetic heads 3 and 4 during the recording in which recording is made with the first magnetic heads 3 and 4. The editing (recording) is carried out in a manner as shown in the flowchart of FIG. 8(*a*) and, specifically, after the start and end points of the edit have been set, the edit ON command has been issued and the winding is effected to the point some tracks preceding the start point of the edition of the tape as shown in steps 81 to 83. During the reproduction until the start point of the edit the absolute height is corrected at step 84 and, at step 85, the recording is carried out with the magnetic heads 3 and 4 while the absolute height is corrected by the tracking error signal 10-(*a*) from the magnetic heads 5 and 6 during the recording.

In other words, when the absolute height correction is carried out during the reproduction at the point some tracks preceding the start point of the edit, the signal to be supplied to the driving circuit 17 for the electric-mechanical transducing elements is switched over to a signal processed by the microcomputer 15 as shown in FIG. 7 by a timing signal 20-(*f*) (timing: t₁). At steps 404 and 410, the predetermined values A and B are, after having been D/A converted by the D/A converter 16, supplied from the microcomputer 15 to the driving circuit 17 for driving the electric-mechanical transducing elements 7 and 8 to drive the first magnetic heads 3 and 4. The tracking error signals 13-(*a*) (1) and (2) of the first magnetic heads 3 and 4 obtained as a result thereof are A/D converted by the A/D converter 14 and are then stored in the memories MA 151 and MB 152 (timings t₁ to t₅). At steps 406 and 412, the tracking error signals 10-(*a*) (3) and (4) of the second magnetic heads 5 and 6 are A/D converted at timings t₂ to t₈ and are then stored in the memories MC 153 and MD 154. At steps 409 and 415, the difference between the tracking error signals 10-(*a*) (3) and (4) of the second magnetic heads 5 and 6 and the tracking error signals 13-(*a*) (1) and (2) of the first magnetic heads 3 and 4 is calculated by the microcomputer 15 and the predetermined reference values A and B stored in the memories MG 157 and MH 158 are changed in an amount corresponding to this difference. By this procedure, the first magnetic heads 3 and 4 and the second magnetic heads 5 and 6 can be rendered to scan the same track. In other words, the first magnetic heads 3 and 4 have corrected the absolute height through the second magnetic heads 5 and 6. After the absolute height has been corrected during the reproduction of some tracks preceding the start point of the edition, the driving data (9) and (10) which correspond to the data (1) stored in the memory MA 151 and the data (2) stored in the memory MB 152 to which the absolute height correction during the reproduction has been added, that is, the reference values AA and BB which correspond to the reference values A and B to which correction has been made, are used to drive the electric-mechanical transducing elements 7 and 8 so that the first and second magnetic heads 3 and 4 can perform the recording at steps 502 to 504 (timings $t_5$ to $t_9$). At steps 506 and 507 and steps 512 and 513, the second magnetic heads 5 and 6 reproduce what has been recorded by the first magnetic heads 3 and 4 and the tracking error signals (5) and (6) are stored in the memories ME 155 and MF156 (timings $t_6$ to $t_{10}$). At steps 509 and 515, the difference between the memories MC 153 and MD 154 and the memories ME 155 and MF 156 is calculated and the previously described reference values AA and BB are corrected so that the difference referred to above can become zero. The driving data (11) and (11) which correspond to the corrected reference values AA and BB are supplied to the driving circuit 17 (timings $t_9$ to $t_{13}$). Thereafter, by the repetition of the above described procedures, the absolute heights of the electric-mechanical transducing elements 7 and 8, that is, the first magnetic heads 3 and 4, under the recording process are corrected.

Thus, even when the recording is made with the first magnetic heads on the electric-mechanical transducing elements, the absolute heights of the first magnetic heads are successively compensated by the second magnetic heads during the recording and, therefore, a favorable edit in which no joint of the edit appear and/or wherein an erasure or an insufficient erasure before and after a track in an area other than the joint of the edition does not occur can be accomplished.

Hereinafter, a second preferred embodiment of the present invention will be described.

Figure 9:
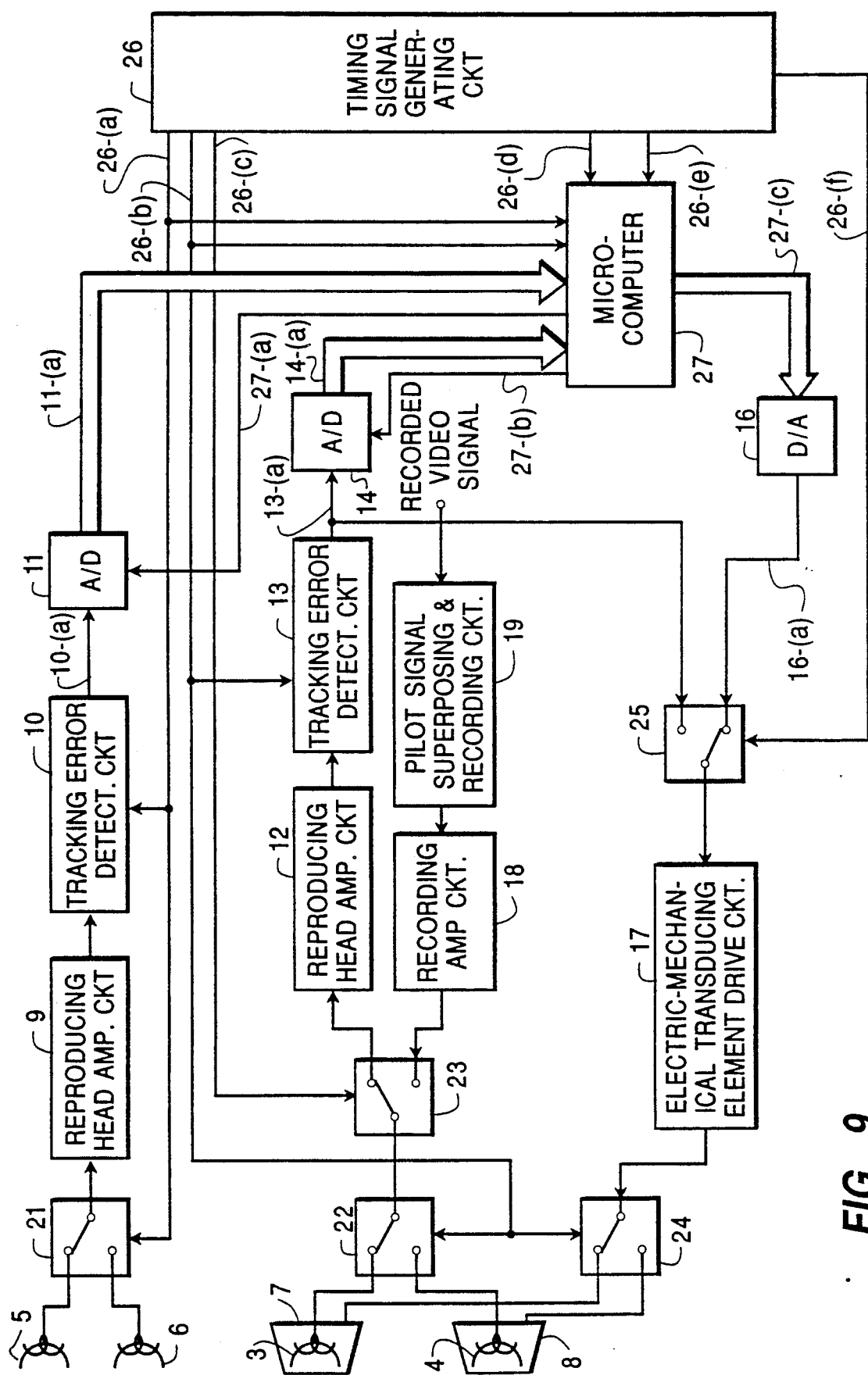
FIG. 9 is a circuit block diagram of the magnetic recording and/or reproducing apparatus according to a second embodiment of the present invention.

Before the description of the operation of the embodiment proceeds, blocks and contents of various signals will first be described. FIG. 9 illustrates a block circuit diagram of the magnetic recording and/or reproducing apparatus according to the second embodiment of the present invention. In FIG. 9, since component parts to which like reference numerals used in FIG. 1 are given function in the same manner as those in FIG. 1, the description thereof will not be reiterated. Reference numeral 26 represents a timing signal generating circuit for generating various timing signals, and a microcomputer 27 processes data from the tracking error detecting circuits 10 and 13 on the basis of the various timing signals, supplied from the timing signal generating circuit 26, to provide data necessary to drive the electric-mechanical transducing elements 7 and 8. On the other hand, reference numeral 10-(a) represents a second tracking error signal obtainable from the second magnetic heads 5 and 6; reference numeral 26-(a) represents a timing signal for switching over between the second magnetic heads 3 and 4; reference numeral 26-(b) represents a timing signal for switching over between the first magnetic heads 3 and 4; reference numeral 26-(c) represents a timing signal for switching over between the recording and the reproduction; reference numeral 26-(c) represents a timing signal used to cause the microcomputer 27 to receive a second tracking error data 11-(a) obtainable from the second magnetic head; reference numeral 26-(e) represents a timing signal used to cause the microcomputer 27 to receive a first tracking error data 14-(a) obtainable from the first magnetic heads; reference numeral 13-(a) represents a first tracking error signal obtainable from the first magnetic heads 3 and 4; reference numeral 27-(a) represents a sampling signal obtained by dividing the timing signal 26-(a) by a predetermined time interval; reference numeral 27-(b) represents a sampling signal obtained by dividing the timing signal 26-(b) by a predetermined time interval; reference numeral 11-(a) represents a second tracking error data which corresponds to the second tracking error signal 10-(a) sampled by the sampling signal 27-(a) from the microcomputer 27; reference numeral 14-(a) represents a first tracking error data which corresponds to the first tracking error signal 14-(a) sampled by the sampling signal 27-(b) from the microcomputer 27; reference numeral 27-(c) represents a data for driving the electric-mechanical transducing elements 7 and 8 which have been processed by the microcomputer 27; reference numeral 16-(a) represents a signal which corresponds to the data 27-(c) having been D/A converted by the D/A converter 16; and reference numeral 26-(f) represents a timing signal for selecting one of the first tracking error signal 13-(a) and the signal 16-(a) for a signal to be supplied to the electric-mechanical transducing element driving circuit 17.

Figure 10:
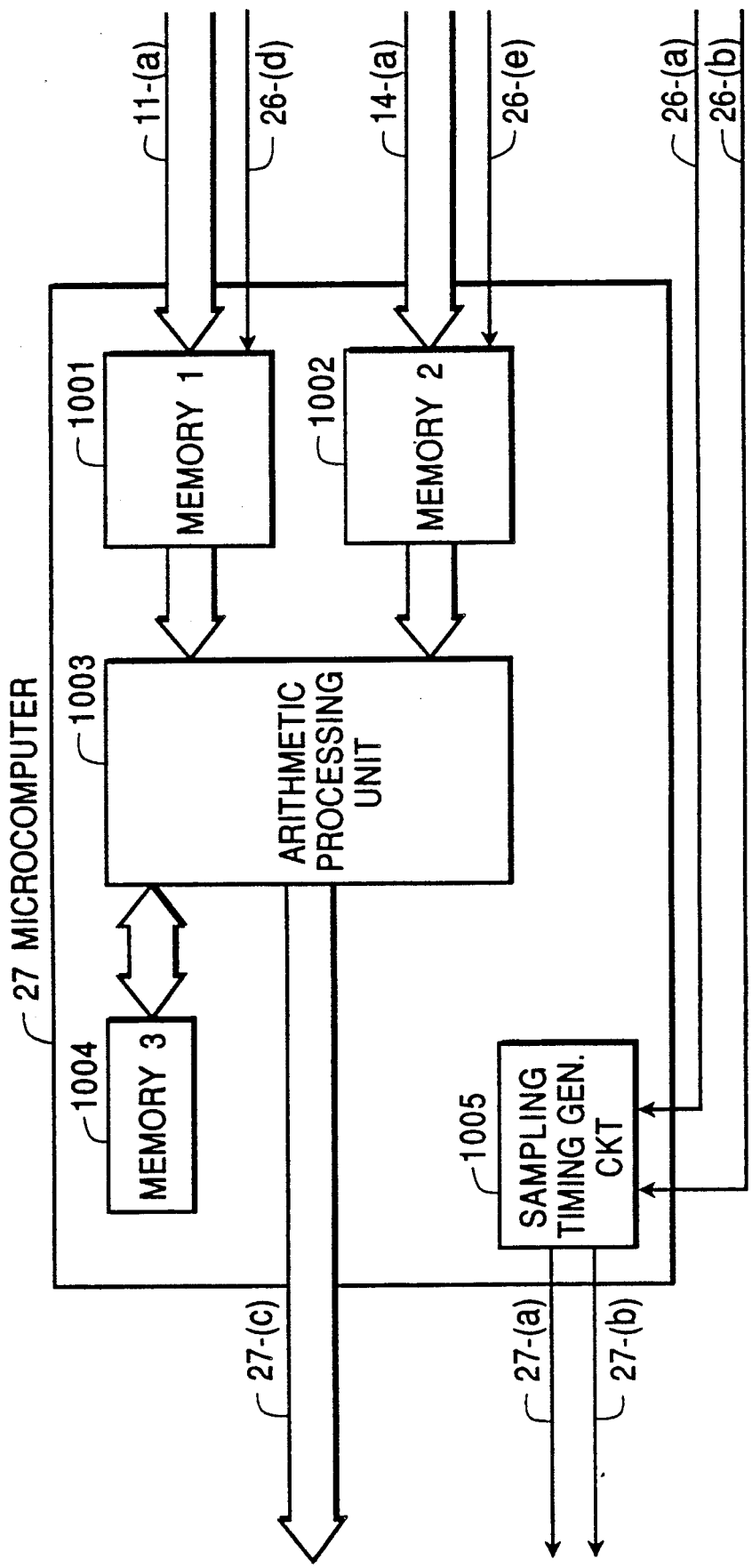
FIG. 10 is a circuit block diagram showing the structure of a process of a microcomputer 27.

FIG. 10 illustrates a block diagram showing a processing structure of the microcomputer 27.

Referring to FIG. 10, reference numeral 1001 represents a memory 1 for storing the data 11-(a) in response to the timing signal 26-(d); reference numeral 1002 represents a memory 2 for storing the data 14-(a) in response to the timing signal 26-(e); reference numeral 1003 represents an arithmetic processing unit for calculating the data stored respectively in the memories 1 and 2 to determine an electric-mechanical transducing element driving gain; reference numeral 1004 represents a memory 3 for setting the electric-mechanical transducing element driving gain obtained by the arithmetic processing unit 1003; and reference numeral 1005 represents a sampling timing generator for generating sampling pulses 27-(a) and 27-(b) spaced respective predetermined time intervals from the timing signals 26-(a) and 26-(b).

Figure 11:
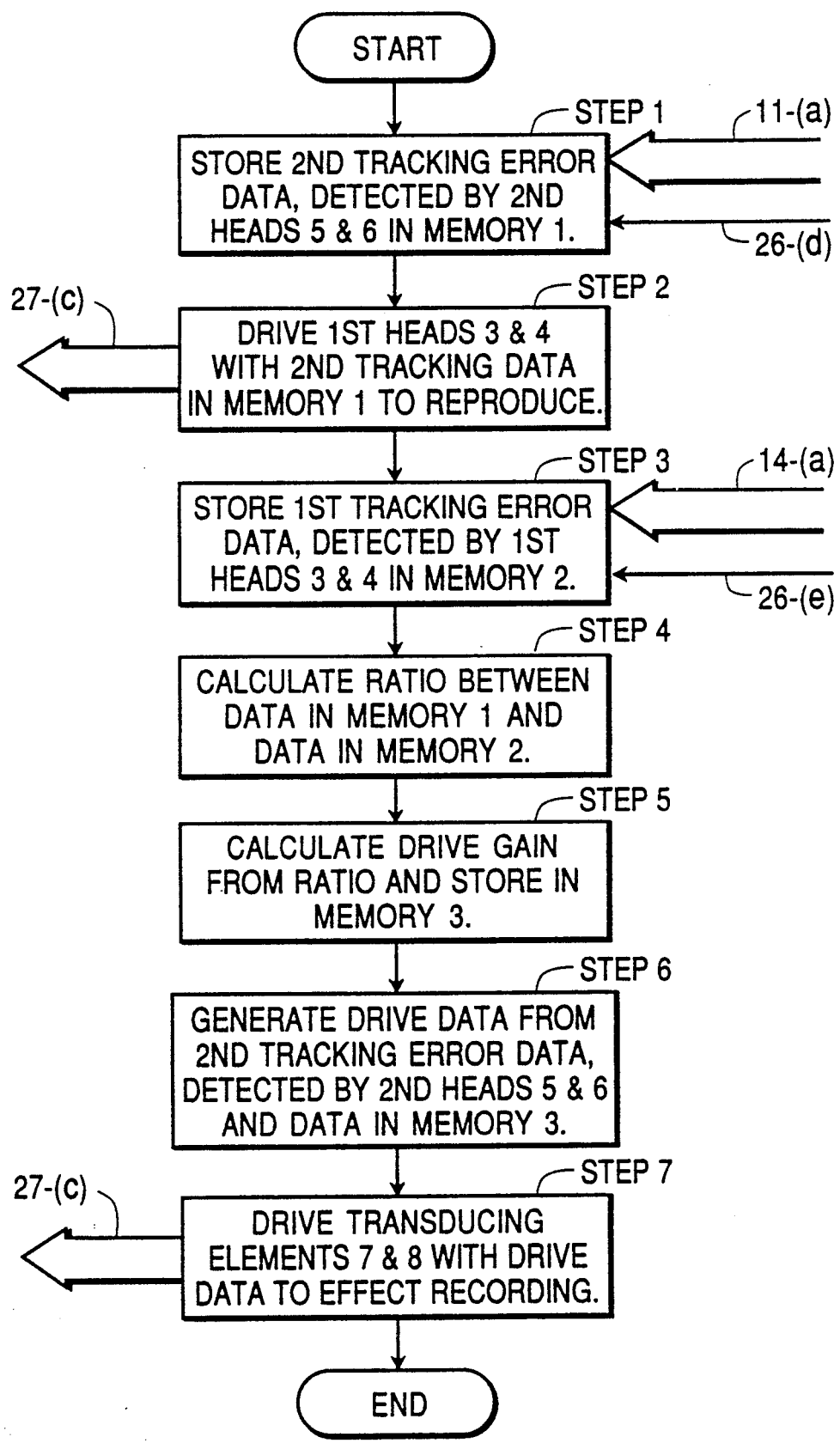
FIG. 11 is a flowchart showing the flow of a process performed in the microcomputer 27.

FIG. 11 is a flowchart showing the flow of a process performed by the microcomputer 27.

In the head construction according to the second embodiment, the amount of deviation in height resulting from the layout angle is similar to that described with reference to FIG. 6(b) in connection with the first embodiment of the present invention. Also, it may be of a construction wherein the deviation in height corresponding to an integer multiple of the track pitch Tp is added.

The general operation of the magnetic recording and/or reproducing apparatus to which the present embodiment is applied will be described with reference to FIG. 9. The reproduced signals reproduced by the second magnetic heads 5 and 6 are, after having been selected by the head switching signal 26-(a) used to select one of the second magnetic heads 5 and 6, supplied to the tracking error detecting circuit 10 through the reproducing head amplifier circuit 9. The tracking error signal 10-(a) detected by the tracking error detecting circuit 10 is stored in the memory 1 after having been A/D converted by the A/D converter 11. On the other hand, during the normal reproduction, the first magnetic heads 3 and 4 are, after having been selected by the head switching signal 26-(b) for selecting one of the first magnetic heads 3 and 4 as is the case with the second magnetic heads, fed to the tracking error detecting circuit 13 through the reproducing head amplifier circuit 12 with the tracking error signal 13-(a) supplied to the electric-mechanical transducing element driving circuit 17 for driving the electric-mechanical transducing elements 7 and 8. As a result thereof, the first magnetic heads 3 and 4 are driven in correspondence with the tracking error signal 13-(a) to scan the track on track. During the recording, a signal which corresponds to the recorded video signal superposed with the pilot signal by the pilot signal superposing and recording circuit 19 is supplied to the first magnetic heads 3 and 4 through the recording amplifier circuit 18, and the signal 16-(a) which has been processed by the microcomputer 27 in response to the timing signal 26-(f) and then D/A converted by the D/A converter 16 is supplied to the driving circuit 17 for the electric-mechanical transducing elements.

Then, a major flow of the process performed by the microcomputer 27 from the calculation of the driving gain in reference to the first and second tracking error data 14-(a) and 11-(a) until the generation of the driving data will now be described with reference to FIGS. 10 and 11.

In FIG. 11, at step 1, the second magnetic heads 5 and 6 is brought into a reproducing state, and the second tracking error data 11-(a) detected by the first magnetic heads 5 and 6 are stored in the memory 1 in response to the timing signal 26-(d). At step 2, the first magnetic heads 3 and 4 are driven by the second tracking error data, stored in the memory 1 at step 1, to perform a reproduction. At step 3, the first tracking error data 14-(a) detected by the first magnetic heads 3 and 4 which perform the reproduction at step 2 is stored in the memory 2 in response to the timing signal 26-(e). At step 4, the ratio between the data stored in the memory 1 and the data stored in the memory 2 is calculated. At step 5, the driving gain is calculated in reference to the ratio calculated at step 4 and is stored in the memory 3. At step 6, the driving data is generated from the second tracking error data detected by the second magnetic heads 5 and 6 and the data stored in the memory 3 at step 5. At step 7, the electric-mechanical transducing elements 7 and 8 are driven by the driving data to cause the first magnetic heads 3 and 4 to perform a recording.

Specific timings of the various signals and their contents and the process performed by the microcomputer will now be described with reference to FIGS. 12 to 17.

Figure 12:
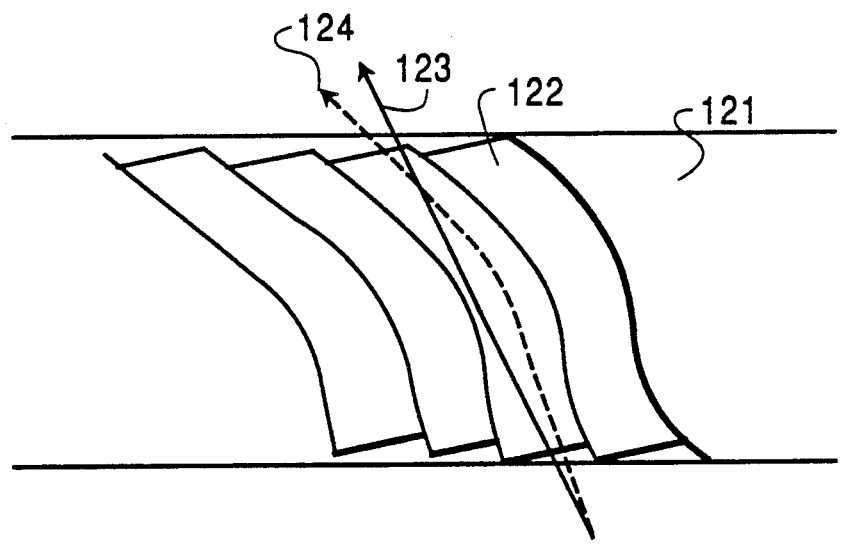
FIGS. 12 and 15 are schematic diagrams showing a relationship between recorded tracks and scanning traces of a magnetic head.
Figure 15:
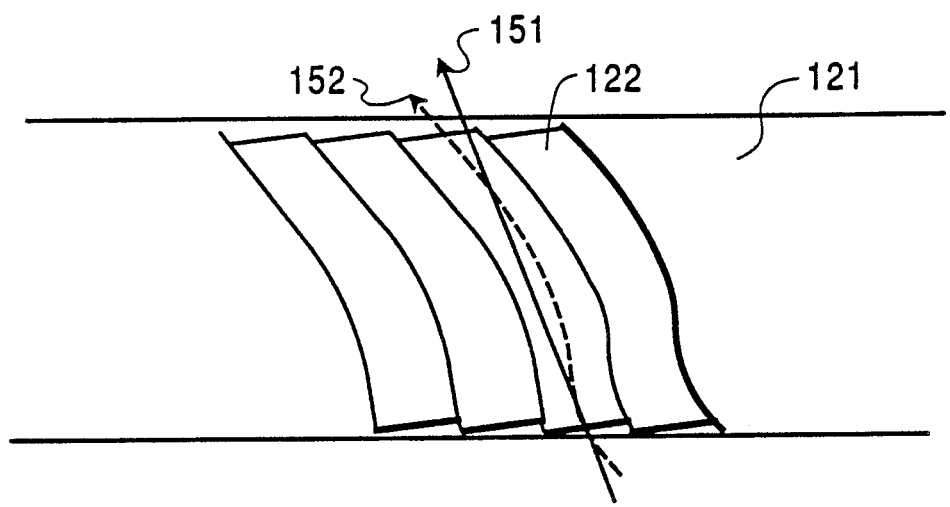

FIGS. 12 and 15 schematically illustrate the relationship between the recorded tracks and the scanning traces of the magnetic head. In FIGS. 12 and 15, reference numeral 121 represents a magnetic tape; reference numeral 122 represents recorded tracks; reference numerals 123 and 151 represent a scanning trace of the second magnetic head 5 or 6; and reference numerals 124 and 152 represent a scanning trace of the first magnetic head 3 or 4.

Figure 13:
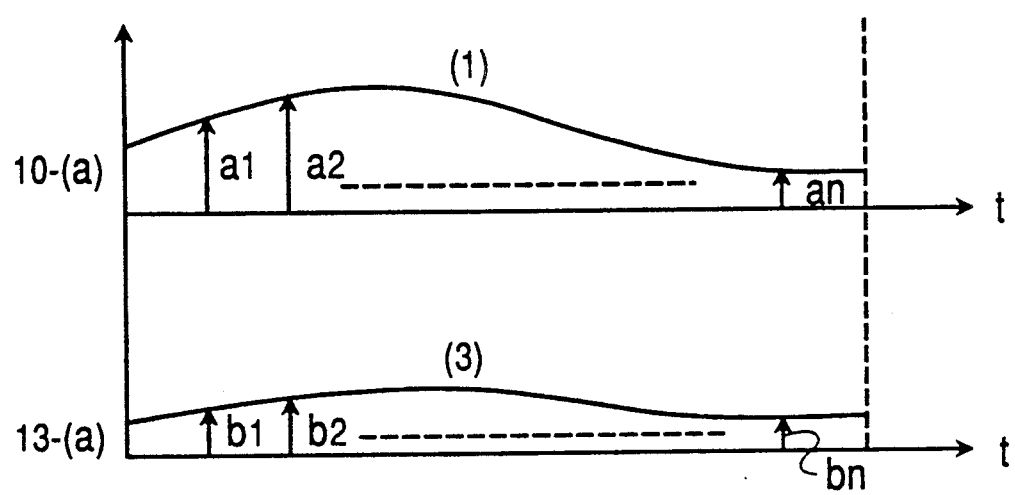
FIGS. 13 and 16 are diagrams showing waveforms of tracking error signals, obtained when first and second magnetic heads 3 and 5 scan the recorded tracks, or driving signals of an electric-mechanical transducing element.
Figure 16:
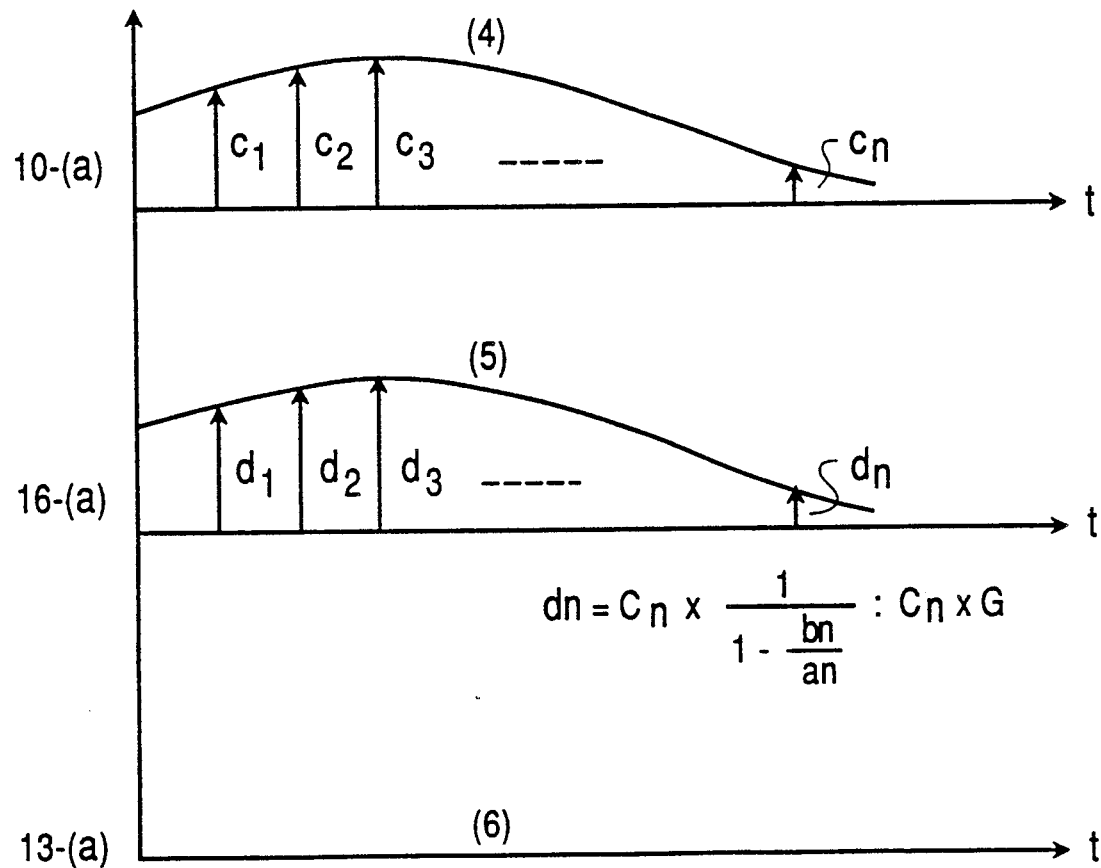

FIGS. 13 and 16 illustrate waveforms of the tracking error signals obtained when the first magnetic head 3 and the second magnetic head 5 scan the recorded tracks. The axis of abscissa represents time and the axis of ordinates represents voltage.

Figure 14:
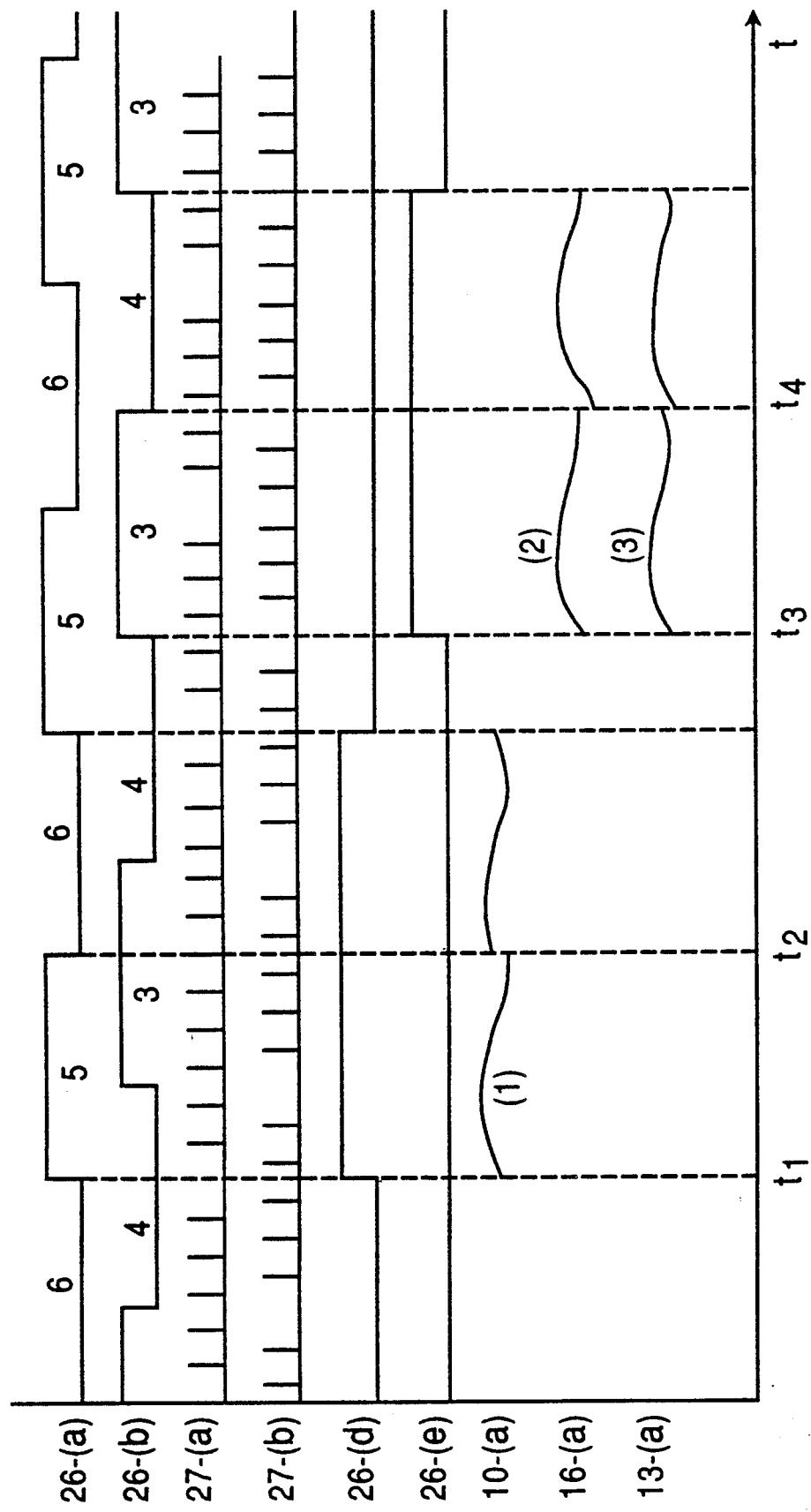
FIGS. 14 and 17 are timing charts showing relationships among various timings from a timing signal generating circuit, a sampling signal from the microcomputer 27 and tracking error signals.
Figure 17:
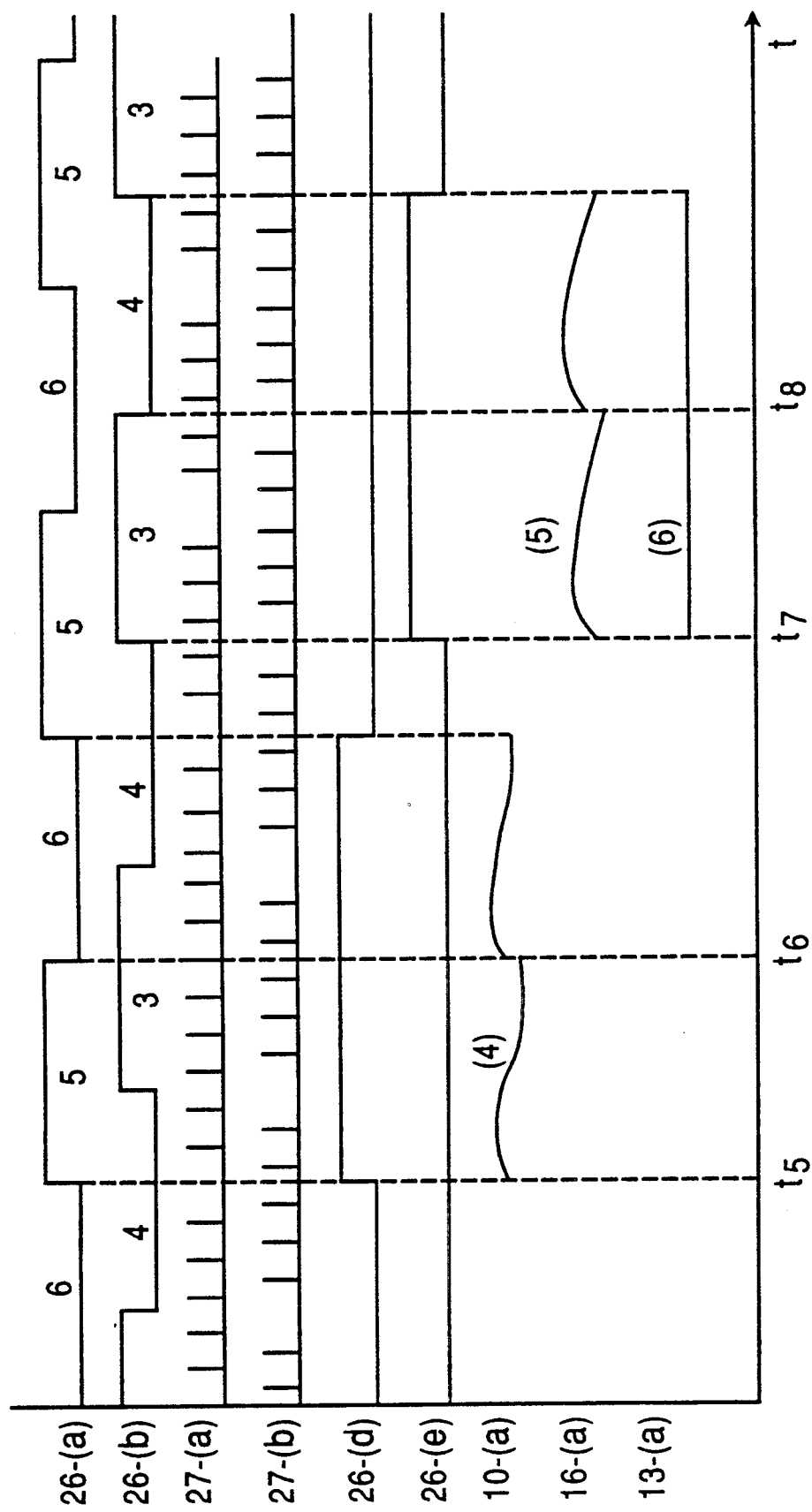
Figure 18:
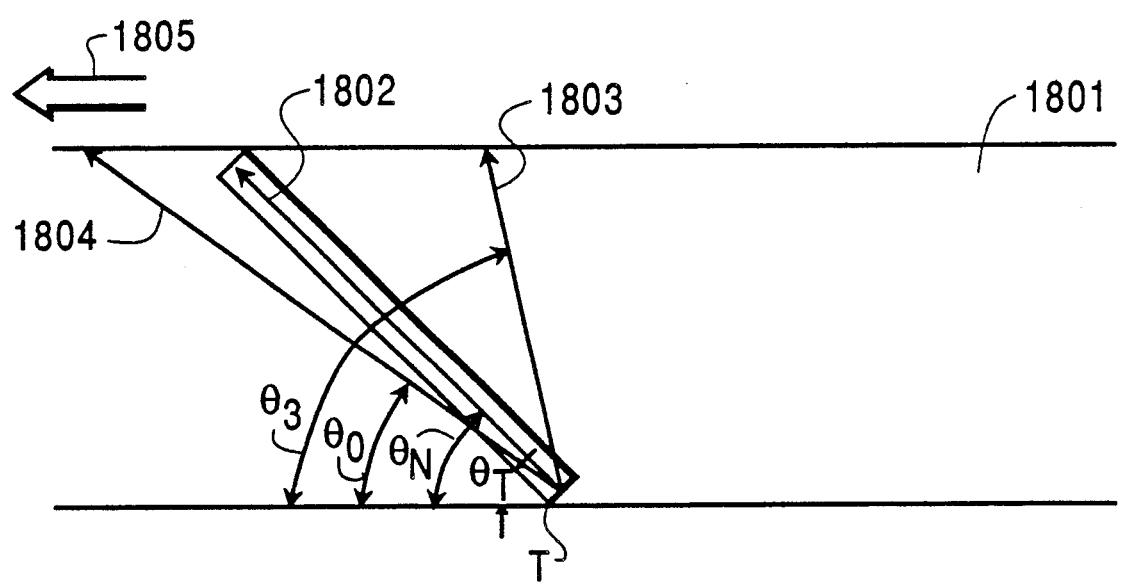
FIG. 18 is a schematic diagram showing the relationship between scanning traces during a normal reproduction and those during a special reproduction.

FIGS. 14 and 17 illustrate timing charts showing the relationships among the various timings from the timing signal generating circuit 26, sampling signals from the microcomputer 27 and the tracking error signals.

Assuming that the reproducing state of the first magnetic heads 3 and 4 is selected by the timing signal 26-(c) and the second magnetic head 5 scans the recorded track 122 as shown by the arrow 123 in FIG. 12 during a period from the timing $t_1$ to the timing $t_2$ shown in FIG. 14, the second tracking error signal shown by (1) in FIG. 13 can be obtained. Values which corresponds to the second tracking error signal sampled by the sampling signal 27-(a) shown in FIG. 14 is indicated by $a_1$, $a_2$, ... $a_n$ and are, after having been A/D converted by the A/D converter 11, stored in the memory 1 by the timing signal 26-(d). On the other hand, when, during a period from the timing $t_3$ to the timing $t_4$ shown in FIG. 14, a data which corresponds to the second tracking error signal (1) multiplied by a predetermined driving gain is outputted from the microcomputer 27 and a signal (2) which is D/a converted by the D/A converter 16 is supplied to the electric-mechanical transducing element driving circuit 17 by the timing signal 26-(f), the electric-mechanical transducing element 7, that is, the first magnetic head 3, can be driven as shown by the arrow 124 in FIG. 12. The first tracking error signal 13-(a) obtained as a result thereof is shown by (3). Values which correspond to the first tracking error signal sampled by the sampling signal 27-(b) shown in FIG. 14 are $b_1$, $b_2$, ... $b_n$ and are, after having been A/D converted by the A/D converter 14, stored in the memory 2 by the timing signal 26-(e).

If the driving gain setting is proper, the arrow 124 in FIG. 12 will be such as indicated by a track bend of the recorded track 122 and the tracking error signal (3) will be zero. In other words, it should be $b_1 = b_2 = ... = b_n = 0$. However, if the driving gain setting is not proper, the tracking error signal corresponding to the extent to which it is not proper will be generated. Assuming now that the driving gain is expressed by G, the relationship among G, $a_1$, $a_2$, ... $a_n$, and $b_1$, $b_2$, ... $b_n$ is as follows.

$$G = 1/(1 - X)$$

wherein $X = (b_1/a_1 + b_2/a_2 + ... b_n/a_n)/n$ (n: positive integer). Thus, X represents an average value of ratios between the tracking error signals detected by the first magnetic heads 3 and 4 at various sampling points and the tracking error signals detected by the second magnetic heads 5 and 6.

Then, the arithmetic processing unit 1003 shown in FIG. 10 determines G from ($a_1$, $a_2$, ... $a_n$) and ($b_1$, $b_2$, ... $b_n$) stored in the memories 1 and 2, respectively, and store it in the memory 3.

Thereafter, when during a period from the timing $t_5$ to the timing $t_8$ the second magnetic head 5 scans the recorded track 122 as shown by the arrow 151 in FIG. 15, the second tracking error signal shown by (4) in FIG. 16 can be obtained. Values which correspond to the second tracking error signal sampled by the sampling signal 27-(a) are $c_1$, $c_2$, ... $c_n$ and are, after having been A/D converted by the A/D converter 11, stored in the memory 1 in response to the timing signal 26-(d). On the other hand, during a period from the timing $t_7$ to the timing $t_8$ shown in FIG. 17, multiplying the second tracking error signal (4) by an optimum driving gain G read from the memory 3 results in a driving data $d_1=c_1\times G$ and $d_2=c_2\times G, \ldots d_n=c_n\times G$. This driving data $d_1, d_2, \ldots d_n$ are outputted from the microcomputer 27. The signal (5) which has been D/A converted by the D/A converter 16 is supplied to the electric-mechanical transducing element driving circuit 17 by the timing signal 26-(f) to drive the electric-mechanical transducing element 7, that is, the first magnetic head 3, as shown by the arrow 152 in FIG. 15. In such case, the tracking error signals 13-(a) of the first magnetic heads 3 and 4 obtained if the reproducing state is selected by the timing signal 26-(c) will be (6). Referring to (6), it will readily be seen that the tracking error signal 13-(a) becomes zero and the first magnetic head 3 scans along the recorded track 122 so as to follow a curvature of such track 122.

Thus, if a recording state of the first magnetic heads 3 and 4 is selected by the timing signal 26-(c) and the recording is effected by the first magnetic heads 3 and 4 in response to the driving data $d_1, d_2, \ldots d_n$, the recording can be made along the recorded track 122 so as to follow the curvature thereof.

Accordingly, even though there is a difference in driving sensitivity in the electric-mechanical transducing elements, the determination of the optimum driving gain before the recording is effective to cause the first magnetic heads 3 and 4 to scan the recorded tracks so as to follow the curvature thereof during the recording. Therefore, even in the magnetic tape wherein there are different curvatures in recorded track at the start and end points of the edit (recording), the favorable edition wherein erasure of tracks on respective sides of the joint and insufficient erasure will not occur can be accomplished.

Although in the foregoing reference has been made to the first magnetic head 3 and the second magnetic head 5, it is to be noted that the first magnetic head and the second magnetic head 6 can operate in respective manners similar to the first magnetic head 3 and the second magnetic head 5.

On the other hand, although the embodiment wherein each of the first and second magnetic heads is comprised of a pair of magnetic heads has been described, the present invention can be applied to the arrangement wherein each of the first and second magnetic heads is comprised of one or more than two magnetic heads.

INDUSTRIAL APPLICABILITY

According to the present invention, since by the foregoing operation the absolute height and the driving sensitivity of the magnetic heads on the electric-mechanical transducing elements can be corrected, it is possible to permit the magnetic heads on the electric-mechanical transducing elements to record on desired tracks. Accordingly, it is possible to avoid any possible erasure or insufficient erasure of the recorded track at the start and end points during the insert edition, and the magnetic recording and/or reproducing apparatus free from any possible disturbance of an image at the joint of edition during the reproduction can be provided.

We claim:

1. A magnetic recording and/or reproducing apparatus characterized in that it comprises a first magnetic head fitted through an electric-mechanical transducing element; a second magnetic head disposed so as to scan a track, scanned by the first magnetic head, before or after a predetermined time; first and second tracking error detecting means for detecting amounts of deviation between scanning traces on a tape, depicted by the first and second magnetic heads, and recorded tracks; and a correction value generating means for generating a correction value from a first tracking error signal provided by the first tracking error detecting means and a second tracking error signal provided by the second tracking error detecting means, and alternatively for generating a correction value by the utilization of one of these first and second tracking error signals, said correction value being utilized to control the electric-mechanical transducing element.

2. A magnetic recording and/or reproducing apparatus characterized in that it comprises a first magnetic head fitted through an electric-mechanical transducing element; a second magnetic head disposed so as to scan a track, scanned by the first magnetic head, after a predetermined time; first and second tracking error detecting means for detecting amounts of deviation between scanning traces on a tape, depicted by the first and second magnetic heads, and recorded tracks; and a correction value generating means for generating a correction value by the use of both of a first tracking error signal, outputted from the first tracking error detecting means, and a second tracking error signal outputted from the second tracking error detecting means in the case where any one of the first and second magnetic heads is in a state of reproducing, but by the use of the second tracking error signal in the case where the first and second magnetic heads are in a state of recording and in a state of reproducing, respectively, said correction value being utilized to correct a reference signal which is used to drive the electric-mechanical transducing element thereby to control the electric-mechanical transducing element.

3. The magnetic recording and/or reproducing apparatus as claimed in claim 2, characterized in that, when both of the first and second magnetic heads are in the reproducing state, a value representative of the difference between the first and second tracking error signals is used as the correction value.

4. The magnetic recording and/or reproducing apparatus as claimed in claim 2, characterized in that, when the first magnetic head is in the recording state and the second magnetic head is in the reproducing state, the difference between the second tracking error signal of a recorded track being currently reproduced and the second tracking error signal of a recorded track one track preceding such recorded track is used as the correction value.

5. A magnetic recording and/or reproducing apparatus characterized in that it comprises a first magnetic head fitted through an electric-mechanical transducing element; a second magnetic head disposed so as to scan a track, scanned by the first magnetic head, after a predetermined time; first and second tracking error detecting means for detecting amounts of deviation between scanning traces on a tape, depicted by the first and second magnetic heads, and recorded tracks; and a driving gain determining means for determining a driving gain for the electric-mechanical transducing element, said driving gain determining means being operable to determine the driving gain for the electric-mechanical transducing element from the first and second tracking error signals provided respectively by the first and second tracking error detecting means, in the case where any one of the first and second magnetic heads is in a state of reproducing, so that the second tracking error signal can be corrected by the driving gain and the electric-mechanical transducing element can then be controlled by such second tracking error signal.

6. The magnetic recording and/or reproducing apparatus as claimed in claim 5, characterized in that, as the driving gain determining means for determining the driving gain for the electric-mechanical transducing element, the driving gain for the electric-mechanical transducing element is determined by sampling at predetermined timings the first tracking error signal obtained provided by the first magnetic head and the second tracking error signal provided by the second magnetic head, calculating respective ratios therebetween to provide an average value of those ratios to give the driving gain which is expressed by $G=1/(1-X)$ wherein G represents the driving gain and X represents the average value of the ratios.

7. A magnetic recording and/or reproducing apparatus characterized in that it comprises a first magnetic head fitted through an electric-mechanical transducing element; a second magnetic head disposed so as to scan a track, scanned by the first magnetic head, after a predetermined time; first and second tracking error detecting means for detecting amounts of deviation between scanning traces on a tape, depicted by the first and second magnetic heads, and recorded tracks; and a correction value generating means for generating a correction value which is a difference between a first tracking error signal, outputted from the first tracking error detecting means, and a second tracking error signal outputted from the second tracking error detecting means in the case where any one of the first and second magnetic heads is in a state of reproducing, but which is a difference between the second tracking error signal, resulting from the recorded track being currently reproduced, and the second tracking error signal resulting from the recorded track preceding such recorded track in the case where the first and second magnetic heads are in a state of recording and in a state of reproducing, respectively, said correction value being utilized to correct a reference signal which is used to drive the electric-mechanical transducing element thereby to control the electric-mechanical transducing element.

8. A magnetic recording and/or reproducing apparatus characterized in that it comprises a first magnetic head fitted through an electric-mechanical transducing element; a second magnetic head disposed so as to scan a track, scanned by the first magnetic head, after a predetermined time; first and second tracking error detecting means for detecting amounts of deviation between scanning traces on a tape, depicted by the first and second magnetic heads, and recorded tracks; and a driving gain determining means for determining the driving gain for the electric-mechanical transducing element in the case where any one of the first and second magnetic heads is in a state of reproducing, the driving gain for the electric-mechanical transducing element is determined by sampling at predetermined timings the first tracking error signal obtained provided by the first magnetic head and the second tracking error signal provided by the second magnetic head, calculating respective ratios therebetween to provide an average value of those ratios to give the driving gain which is expressed by $G=1/(1-X)$ wherein G represents the driving gain and X represents the average value of the ratios, said driving gain being used to correct the second tracking error signal so that the electric-mechanical transducing element can be controlled by such corrected second tracking error signal.

* * * * *

UNITED STATES PATENT AND TRADEMARK OFFICE
CERTIFICATE OF CORRECTION

PATENT NO. : 5,072,319

DATED : December 10, 1991

INVENTOR(S) : Toshiyuki KOHRI et al.

It is certified that error appears in the above-identified patent and that said Letters Patent is hereby corrected as shown below:

Item [86] of cover page, change " § 371 Date: March 26, 1990
§ 102(e) Date: March 26, 1990" to
-- § 371 Date: March 6, 1990
§ 102(e) Date: March 6, 1990--.

Signed and Sealed this

Twenty-first Day of December, 1993

Attest:

BRUCE LEHMAN

*Attesting Officer*      *Commissioner of Patents and Trademarks*